US012724524B2

(12) United States Patent
Kaliyaperumal et al.

(10) Patent No.: US 12,724,524 B2
(45) Date of Patent: Sep. 1, 2026

(54) CURSOR PROMPT INTERFACES FOR FACILITATING MULTIPLE FUNCTIONALITY

(71) Applicant: Microsoft Technology Licensing, LLC, Redmond, WA (US)

(72) Inventors: PalaniRaj Kaliyaperumal, Redmond, WA (US); Kuralmani Elango, Bothell, WA (US); Deepanjan Bhol, Kenmore, WA (US); Jennifer Janell Gregory, Bellevue, WA (US); Christina Montefalcon Ramsey, Redmond, WA (US); Juliette Danielle Weiss, Renton, WA (US); Kyle Jay Rindahl, Marysville, WA (US); Farhaz A Karmali, Redmond, WA (US); Julie Strauss, Olalla, WA (US); Per Grønvold Mikkelsen, Seattle, WA (US); Jennifer Wang, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 176 days.

(21) Appl. No.: 18/420,365

(22) Filed: Jan. 23, 2024

(65) Prior Publication Data

US 2025/0156026 A1 May 15, 2025

Related U.S. Application Data

(60) Provisional application No. 63/548,450, filed on Nov. 14, 2023.

(51) Int. Cl.

*G06F 3/04812* (2022.01)
*G06F 3/04817* (2022.01)
*G06F 3/04842* (2022.01)

(52) U.S. Cl.

CPC ...... *G06F 3/04812* (2013.01); *G06F 3/04817* (2013.01); *G06F 3/04842* (2013.01)

(58) Field of Classification Search

CPC ............. G06F 3/04812; G06F 3/04817; G06F 3/04842

See application file for complete search history.

(56) References Cited

U.S. PATENT DOCUMENTS

2011/0080341 A1* 4/2011 Helmes .................. G06F 3/041 345/157
2014/0149432 A1* 5/2014 Chilana ............ G06F 16/24575 707/749

(Continued)

OTHER PUBLICATIONS

U.S. Appl. No. 63/548,448, filed Nov. 14, 2023.

(Continued)

*Primary Examiner* — Cao H Nguyen
(74) *Attorney, Agent, or Firm* — Workman Nydegger

(57) ABSTRACT

Systems and methods are provided for utilizing cursor prompt interfaces to facilitate multiple functionalities and techniques for interacting with content selected by corresponding cursor prompts. Selection of displayed content causes the cursor prompt interfaces to be generated and displayed with interactive components for generating new content corresponding to the selected content and that is based on a context of the application instance and/or a user context. In some instances, the cursor prompt interfaces also interact with remote machine-learning models to obtain the new content.

22 Claims, 23 Drawing Sheets

(56) References Cited

U.S. PATENT DOCUMENTS

| | | | | |
|---|---|---|---|---|
| 2016/0086085 | A1* | 3/2016 | Sweeney | G06N 5/02 706/11 |
| 2016/0378294 | A1 | 12/2016 | Wright et al. | |
| 2017/0131784 | A1* | 5/2017 | Holz | G06F 3/017 |
| 2019/0018497 | A1 | 1/2019 | Holz | |
| 2022/0198136 | A1* | 6/2022 | Peleg | G06N 3/088 |
| 2025/0156027 | A1 | 5/2025 | Kaliyaperumal | |
| 2025/0245030 | A1 | 7/2025 | Cyjon | |

OTHER PUBLICATIONS

U.S. Appl. No. 63/548,450, filed Nov. 14, 2023.
U.S. Appl. No. 18/420,380, filed Jan. 23, 2024.
Non-Final Office Action mailed on Nov. 5, 2025, in U.S. Appl. No. 18/420,380, 12 Pages.
Notice of Allowance mailed on Apr. 23, 2026, in U.S. Appl. No. 18/420,380, 09 pages.

* cited by examiner

CURSOR PROMPT INTERFACES FOR FACILITATING MULTIPLE FUNCTIONALITY

CROSS-REFERENCE TO RELATED APPLICATIONS

This application claims the benefit U.S. Provisional Patent Application Ser. No. 63/548,450, filed on Nov. 14, 2023, entitled "CURSOR PROMPT INTERFACES FOR FACILITATING MULTIPLE FUNCTIONALITY," and which application is expressly incorporated herein by reference in its entirety.

BACKGROUND

Cursor prompts, sometimes referred to as mouse prompts, are a fundamental component of graphical user interfaces. Movements and interactions of the cursor prompts are often controlled by I/O (input/output) mouse devices, but may also be controlled by other types of I/O controllers, such as keyboards, cameras and gesture detection devices, voice control devices, etc.

Cursor prompts may take the form of a pointed arrow, a hand with a pointed finger, or another pointed structure that is moved by a controller around a user interface and which may be used to select elements displayed within the user interfaces.

Conventional functionality that can be invoked with a cursor prompt includes the selection of content that is being pointed to or encircled by the movement of the cursor prompt. Once selected, the content can be copied and pasted or moved with the cursor prompt. Other functionality can include, for example, the triggering of a browser to open a webpage associated with a hyperlink selected by the cursor prompt.

While the cursor prompt has been a valuable tool in the realm of human-computer interaction, its limited capabilities and lack of adaptability have given rise to various shortcomings and frustrations experienced by users.

By way of example, traditional cursor prompts are typically equipped with only a very a basic set of functions, primarily limited to tasks such as selecting text or other displayed items and triggering specific actions, such as copying, pasting, moving the selected content, or opening files or applications that are linked to the content that is being selected (e.g., selection of a hyperlink to open a webpage).

Traditional cursor prompts also lack the ability to automate repetitive tasks or respond to context-specific user needs. Users are frequently compelled to perform the same sequences of actions manually, leading to inefficiency and reduced productivity.

When users need to perform complex tasks that require multiple steps or a combination of interactions, the limitations of traditional cursor prompts become particularly apparent.

In light of these problems associated with the limited capabilities of traditional cursor prompts, there exists an ongoing need and desire for improved systems and methods that can be used to enhance the capabilities and functionalities provided for cursor prompts, as well as the corresponding cursor prompt interfaces, particularly for enabling richer forms of interacting with content selected by the cursor prompts.

SUMMARY

The techniques described herein relate to computer-implemented methods and corresponding systems for utilizing cursor prompt interfaces to facilitate multiple functionalities and techniques for interacting with content selected by corresponding cursor prompts.

In some aspects, a computer-implemented method is provided for enabling or utilizing cursor prompt interfaces to facilitate multiple functionalities and techniques for interacting with content selected by corresponding cursor prompts, the method including: presenting a user interface with displayed content; presenting a cursor prompt associated with a cursor for selecting the content; detecting the cursor prompt being used to make a selection of selected content; and determining whether cursor is in an artificial intelligence (AI) cursor mode during the selection of the selected content and responsively either: (i) in response to determining the cursor is in the AI cursor mode during the selection, identifying a plurality of different functions that can be applied with the selected content including at least one function for generating new content related to the selected content and displaying the at least one function in a new cursor prompt interface at the user interface, or alternatively, (ii) in response to determining the cursor is not in the AI cursor mode during the selection, refraining from displaying the at least one function in the new cursor prompt interface at the user interface.

In some aspects, the techniques described herein relate to a system, including: a processor system; and a computer storage medium that stores computer-executable instructions that are executable by the processor system to implement a method for utilizing cursor prompt interfaces and by at least causing the system to: present a user interface with displayed content; present a cursor prompt associated with a cursor for selecting the content; detect the cursor prompt being used to make a selection of selected content; and determine whether cursor is in an artificial intelligence (AI) cursor mode during the selection of the selected content and responsively either: (i) in response to determining the cursor is in the AI cursor mode during the selection, identify a plurality of different functions that can be applied with the selected content including at least one function for generating new content related to the selected content and displaying the at least one function in a new cursor prompt interface at the user interface, or alternatively, (ii) in response to determining the cursor is not in the AI cursor mode during the selection, refrain from displaying the at least one function in the new cursor prompt interface at the user interface.

This Summary introduces a selection of concepts in a simplified form that are further described below in the Detailed Description. This Summary is not intended to identify key features or essential features of the claimed subject matter, nor is it intended to be used to determine the scope of the claimed subject matter.

BRIEF DESCRIPTION OF THE DRAWINGS

To describe how the advantages of the systems and methods described herein can be obtained, a more particular description of the embodiments briefly described is rendered by reference to specific embodiments thereof, which are illustrated in the appended drawings. These drawings depict only typical embodiments of the systems and methods described herein and are not, therefore, to be considered to be limiting in their scope. Systems and methods are described and explained with additional specificity and detail through the use of the accompanying drawings, in which:

FIGS. 16-21 illustrate additional examples of user interfaces with components of a multi-modal cursor, such as described in FIGS. 1-6.

DETAILED DESCRIPTION

Figure 1:
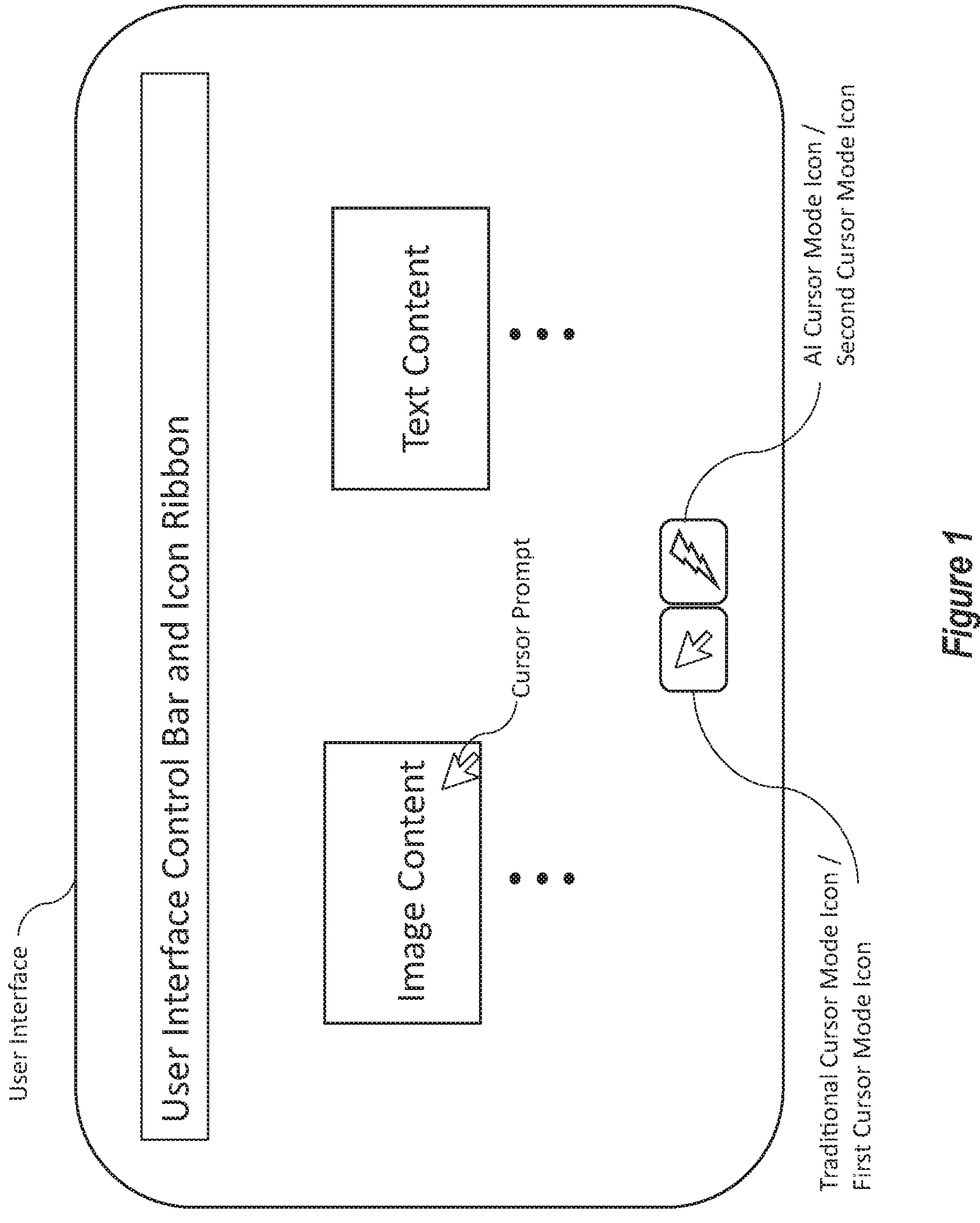
FIGS. 1-6 illustrate examples of user interfaces with components of a multi-modal cursor, including cursor icons that can be selected by user input to select and/or switch the cursor mode used by a cursor in the user interfaces to interact with the displayed and selectable content presented within blocks/frames of the user interfaces.

Systems and methods are provided for utilizing cursor prompt interfaces to facilitate multiple functionalities and techniques for interacting with content selected by corresponding cursor prompts.

The computer-implemented method for facilitating multiple functionalities through cursor prompt interfaces begins with the display of content on a user interface. The content can be any form of information that can be presented to a user on a display device, including but not limited to text, images, charts, and graphs. The content can be static or dynamic, and it can be generated locally or retrieved from a remote source.

When the user uses the cursor prompt to make a selection of content (referred to herein as selected content or selectable content), the system detects this selection. The detection of the selection can be based on various factors, such as the position of the cursor, the type of content selected, or the user's interaction with the cursor prompt.

Upon detecting a selection of content, the system determines whether the cursor is in an artificial intelligence (AI) cursor mode during the selection. The AI cursor mode is a state of the cursor that enables additional, intelligent functionality based on the context of the user's current task or the content they are interacting with, as well as the user's own personal context information. The determination of whether the cursor is in the AI cursor mode can be based on various factors, such as the user's settings, the type of content selected, or the user's interaction with the cursor prompt and/or prompt icons.

The AI cursor mode is a specific state of the cursor that enables additional, intelligent functionality based on the context of the user's current task or the content they are interacting with. The determination of whether the cursor is in the AI cursor mode can be based on various factors. For instance, the user's settings, the type of content selected, or the user's interaction with the cursor prompt can all influence the determination of the AI cursor mode. In some cases, the AI cursor mode may be manually selected by the user, while in other cases, the system may automatically switch to the AI cursor mode based on the detected context.

When the cursor is determined to be in the AI cursor mode during the selection of content, the system identifies a plurality of different functions that can be applied to the selected content. These functions are not just identified, but also displayed in a new cursor prompt interface on the user interface. The functions that are identified and displayed can vary based on the context of the user's current task or the content they are interacting with. For example, if the user is interacting with a text document, the functions might include options for formatting the text, checking the spelling, or translating the text into another language. If the user is interacting with an image, the functions might include options for editing the image, adding annotations, or searching for similar images.

The functions that are identified and displayed can be a filtered subset of the total functions identified, such that only a predetermined quantity of functions are displayed and/or functions that are determined to meet a predetermined threshold of relevance, wherein the relevance determination is made for the functions based on a ranking model trained to evaluate relevance based on predetermined parameters related to user contexts, types of content, interface states and/or functionalities that may be relevant to the user.

The identification and display of these functions in the AI cursor mode provide the user with a range of options for interacting with the selected content, thereby facilitating multiple functionalities through the cursor prompt interface. This can enhance the user's experience by providing them with contextually relevant functions that can be applied to the selected content, thereby reducing the amount of time and effort the user has to spend on navigating through menus or performing manual tasks.

In contrast to the AI cursor mode, there is a scenario where the cursor is not in the AI cursor mode during the selection of content. This could be due to various factors such as user preference, system settings, or the nature of the task at hand. For instance, the user might prefer to use the traditional cursor mode for simple tasks that do not require advanced functionalities, or the system might automatically switch to the non-AI cursor mode when the user is interacting with content that does not support AI functionalities.

When the cursor is determined to be not in the AI cursor mode during the selection of content, the system behaves differently compared to when the cursor is in the AI cursor mode. Specifically, the system refrains from displaying the at least one function in the new cursor prompt interface on the user interface. This means that the user is not presented with the additional functions that can be applied to the selected content, as they would be in the AI cursor mode. Instead, the cursor prompt operates as a traditional cursor prompt.

The benefits of providing the cursor prompt interface to the user with the different functionalities should be apparent and are very diverse. By way of example, if the user is interacting with a text document, the system might identify functions related to text editing, such as formatting, spell-checking, or translation. If the user is interacting with an image, the system might identify functions related to image editing, such as cropping, resizing, or color adjustment. If the user is interacting with a chart or graph, the system might identify functions related to data analysis, such as trend analysis, data filtering, or data visualization. In each case, the functions that are identified are contextually relevant to the user's context, thereby enhancing the user's experience and facilitating multiple functionalities through the cursor prompt interface.

The user can also make multiple selections of different types of content and the system can consider possible functions that might be relevant to the different content selections, such as compare and analyze similarities and/or differences. The system can generate graphs or charts that visually represent the analyzed data.

The functions and functionalities identified can be provided by models that are trained to perform the referenced functions and that are stored locally and/or remotely.

Furthermore, the system is capable of dynamically updating the identified functions based on changes in the user's context. For instance, if the user switches from interacting with a text document to interacting with an image, the system can update the identified functions to reflect this change in context. This dynamic updating of the identified functions ensures that the functions that are displayed to the user are consistently relevant and useful, regardless of changes in the user's context.

In some scenarios, the user input at the new cursor prompt interface causes the system to replace the selected content. This involves receiving user input at the new cursor prompt interface, such as a command to replace the selected content, and replacing the selected content with the new content after performing the at least one function. The replacement of the selected content can be achieved through various means, such as overwriting the selected content with the new content, deleting the selected content and inserting the new content in its place, or moving the selected content to a different location and inserting the new content in the original location of the selected content.

In other scenarios, the system generates and displays the new content concurrently with the selected content in the user interface after performing the at least one function. This involves generating the new content, such as a transformed version of the selected content or additional content related to the selected content, and displaying the new content on the user interface alongside the selected content. The concurrent display of the new content and the selected content can provide the user with a side-by-side comparison of the original and transformed content, or a comprehensive view of the selected content and related content.

In each of these scenarios, the system facilitates multiple functionalities through the cursor prompt interface by enabling the user to interact with the selected content in various ways, such as transforming the content, accessing related content, or replacing the content. This enhances the user's experience by providing them with a range of options for interacting with the selected content, thereby reducing the amount of time and effort the user has to spend on navigating through menus or performing manual tasks.

Some aspects of the invention also include managing the utilization and switching of modes for a multi-modal cursor or cursor prompt that is used to trigger the generation and display of the referenced cursor prompt interfaces when the cursor prompt is in an AI cursor mode, for example.

In some embodiments, user interfaces are presented with selectable content, along with a cursor prompt for a multi-modal cursor. A traditional cursor mode icon and an artificial intelligence (AI) cursor mode icon are also displayed within the user interfaces. The systems determine which mode of the multi-modal cursor to activate and utilize based on user input selecting either the traditional cursor mode icon or the AI cursor mode icon. User selection of the traditional cursor mode icon activates the first cursor mode and user selection of the AI cursor mode icon activates the second cursor mode.

In some aspects, a user interface is presented with one or more display blocks (also referred to as frames), each containing selectable content. The selectable content may include, but is not limited to, text, images, charts, or graphs. The user interface also presents a cursor prompt for a multi-modal cursor. This multi-modal cursor is associated with two distinct modes: a first cursor mode and a second cursor mode.

The first cursor mode is a non-contextual functionality mode. In this mode, the cursor operates in a traditional manner, allowing the user to select and/or manipulate the selectable content (e.g., select, copy, paste and sometimes edit the selected content) within the display blocks. The second cursor mode is a contextual functionality-enabling mode. This mode leverages artificial intelligence (AI) technologies to provide enhanced functionality based on the context of the user and the context of the application or user interface instance.

The context of the user can include a user position or title, historical or preference data that indicates how a user has interacted with or prefers to interact with different types of data (e.g., image data, text data, multimedia data, and other data types). The context of the user can also include a previous action, such as a previous selection of data, a navigation with the interface, opening an application, or a query submitted by a user. The context of the user can also include authorizations, subscriptions, and services associated with the user. The context of the user can also include calendar information and other personal information associated with temporal scheduling and events associated with the user. User context data may also include geographic and language preferences. User context data may also include education level, job description and financial information about the user.

The system may use the context of the user and/or the context of the application and/or interface instance when selecting a functionality from a plurality of different functionalities to apply to selected content that is selected by the cursor prompt when the cursor prompt is in the AI cursor mode, as described in more detail below. The functionality may be a functionality, for example, to compare or analyze the selected content with other previously selected content or to apply a machine-learning model to the selected content, such as a model trained to perform a particular task.

By way of example, the selection of the content with the cursor prompt when that prompt is in the AI cursor mode may cause the system to determine to perform a translation of selected text based on a language of the user or a previously performed task (e.g., to translate a passage of selected text from one language to another language associated with the user). Another task that may be selected, by way of example, is a task to convert the selected text to audible speech with a text-to-speech model, based on context of the user, for example, or a context of the application or interface instance (e.g., a user has recently opened an application related to text-to-speech functionality). Another example includes selecting a functionality to perform a transformation on image data (e.g., modifying an image with a particular transform, to enhance a resolution or apply a filter). Another example includes determining that data should be presented in a table or chart format, or alternatively, to change the table or chart/graph format from a first format (e.g., a line chart) to a second format (e.g., a pie chart).

The system preferably identifies different functionalities that are available to the user, based on the context information referenced above. The system also identifies and selects a function from the plurality of different functions that could be applied, based on the context information and which may also include a type of content being selected, and then generates a call or command for a corresponding model or executable to be applied to the selected text to perform the selected functionality.

When multiple functionalities are determined to be available and relevant to a selection of content by the cursor prompt (when in the AI cursor mode), the selection of the content will generate a corresponding cursor interface (also referred to herein as a cursor prompt interface) that presents one or more of the identified functionalities determined to be available and relevant to the selection of content. At least one of the identified functionalities includes an interaction with a remote machine learning model. In some instances, the identified functionalities presented within the cursor interface include an option to generate and replace selected content or a generate and display new corresponding content with the selected content.

To enable the foregoing processes, the system determines a type of content that is selected in response to detecting content has been selected. The system may determine a type of content based on metadata and identifiers contained with or associated with the data. The system may additionally, or alternatively, periodically apply a model trained to identify content types to the different content that is presented within the user interface.

The different context information and the different tables mapping the content types and functionalities and models that may be applied to the different content types are stored within storage of the system or within an accessible storage of a remote third-party system.

Within the user interface, both a traditional cursor mode icon and an AI cursor mode icon are presented. These icons serve as visual representations of the two modes of the multi-modal cursor. The user can switch between the two modes by selecting the respective icons. Specifically, user selection of the traditional cursor mode icon activates the first cursor mode, while user selection of the AI cursor mode icon activates the second cursor mode. This allows the user to easily and quickly switch between the two modes of the multi-modal cursor, depending on their current task or preference.

The user interface provides a visual platform for the user to interact with the multi-modal cursor and the selectable content. The user interface is designed with one or more display blocks or frames that each contains different selectable content and, sometimes, content of different types (e.g., a first block/frame may include content from a first source and be of a first type, such as text, and the second block/frame may include content from a second source and be of a second type, e.g., an image type or a chart/graph type data. It will be appreciated, in this regard, the selectable content can take various forms, including but not limited to, text, images, charts, or graphs. The specific type of selectable content presented within the display blocks can vary based on the specific application or task at hand.

Within the user interface, a cursor prompt for the multi-modal cursor is presented. The cursor prompt serves as a visual representation of the multi-modal cursor, allowing the user to see where the cursor is currently positioned within the user interface. The cursor prompt can take various forms, depending on the mode of the multi-modal cursor that is currently activated. For example, in the first cursor mode, the cursor prompt may be presented in a first format, such as a traditional arrow or hand and pointed finger shape. In the second cursor mode, the cursor prompt may be presented in a second format, which could be a different shape or color to distinguish it from the first format. In one example, the shape of the second cursor mode is a shape other than an arrow or hand/finger. Such a shape may be, for example, a lightning bolt or a circle that indicates connectivity with a point extending from the circle. Other shapes may also be used.

Alternatively, the second cursor mode and the first cursor mode have a same shape, only different colors and/or sizes. For instance, the traditional first cursor mode may be associated with a solid black arrow or black-outlined arrow and the second cursor mode may be associated with a red, yellow, orange, green or other colored arrow.

In the disclosed embodiments, the user interface may also be presented with two distinct icons that are displayed within the interface: a traditional cursor mode icon and an AI cursor mode icon. These icons may be displayed along a bottom boundary of the interface, within the control/menu ribbon of the interface, or at other location. These icons serve as visual indicators of the two modes of the multi-modal cursor. The traditional cursor mode icon represents the first cursor mode, the non-contextual functionality mode. The AI cursor mode icon, on the other hand, represents the second cursor mode, the contextual functionality-enabling mode. Both icons are presented simultaneously within the user interface, allowing the user to easily switch between the two modes of the multi-modal cursor by selecting the respective icon.

The determination of which mode of the multi-modal cursor to activate and utilize is based on user input. Specifically, the user can select either the traditional cursor mode icon or the AI cursor mode icon within the user interface to activate the respective mode of the multi-modal cursor. This selection process provides the user with control over the functionality of the cursor, allowing them to switch between modes as desired or as the task at hand requires.

When the user selects the traditional cursor mode icon, the first cursor mode, or the non-contextual functionality mode, is activated. In this mode, the cursor operates traditionally, allowing the user to select and manipulate the selectable content within the display blocks. The cursor prompt is presented in a first format associated with this first/traditional mode, providing a visual indication of the active traditional mode to the user.

On the other hand, when the user selects the AI cursor mode icon, the second cursor mode, or the contextual functionality-enabling mode, is activated. This mode leverages AI technologies to provide enhanced functionality based on the context of the user's actions and the instance of the user interface.

In some instances the cursor prompt changes to a second format associated with the activated AI cursor/second cursor mode, which may be a different shape or color to distinguish it from the first format and which may correspond to the shape and/or coloring of the displayed cursor mode icons. This change in the presentation of the cursor prompt provides a visual cue to the user that the second/AI cursor mode has been activated.

Likewise, in some instances, the icon associated with a currently activated cursor mode is highlighted or visually distinguished with a change in size, animation, coloring, or other feature to reflect the currently active mode of the cursor prompt. Alternatively, the cursor associated with the inactive mode of the cursor prompt may be de-emphasized by reducing a size of the icon, or increasing a transparency of the icon.

As just generally described, the system enables a user to selectively switch which cursor mode is used to interact with selected content in the user interface.

In the first cursor mode, or the non-contextual functionality mode, a user input selection of content with the cursor prompt triggers traditional cursor actions. For example, the user input may cause the cursor to select and highlight the selectable content. This highlighted content can then be used for a subsequent copy function, allowing the user to easily copy the content and paste it elsewhere within the user interface or in another application. Alternatively, the user input may trigger a display of a menu associated with functions that can be performed by an application associated with the user interface with the selected content. This menu may include options such as cut, copy, paste, delete, or other functions, providing the user with a range of actions that they can perform on the selected content.

In contrast, in the second cursor mode, or the contextual functionality-enabling mode, the system determines a context associated with an instance of the user interface and a context of the user for the content being selected by the cursor prompt. This context determination process is a central aspect of the enhanced functionality provided by the second cursor mode. The context associated with an instance of the user interface may include various factors, such as the type of selectable content presented within the display blocks, the location of the multi-modal cursor within the user interface, the applications that are accessible to the user through the interface, and the functions that can be applied from these applications to the selectable content. The context of the user, on the other hand, may include factors such as the user's previous actions, preferences, or other user-specific information.

Based on the determined context, the system determines one or more contextual functions to enable when the cursor prompt is in the second cursor mode. These contextual functions are functions that are relevant to the current context, providing enhanced functionality that is tailored to the user's current task or preference. The determination of the one or more contextual functions to enable is based on the context associated with the instance of the user interface and/or the context of the user. This context-aware functionality allows the cursor to adapt its behavior and provide functions that are relevant to the current context, thereby enhancing the user's interaction with the user interface and the selectable content within it.

For example, if the context determination process determines that the user is currently working on a text document and the cursor is positioned over a piece of text, the system may enable a contextual function that allows the user to perform text-related actions, such as formatting the text or checking the spelling. On the other hand, if the context determination process determines that the user is currently viewing an image and the cursor is positioned over the image, the system may enable a contextual function that allows the user to perform image-related actions, such as zooming in on the image or applying a filter. In this way, the system provides a dynamic and context-aware user experience, allowing the user to interact with the user interface and the selectable content in a more intuitive and efficient manner.

When the user makes a selection of content with the cursor prompt, different actions are triggered depending on whether the cursor prompt is in the first cursor mode or the second cursor mode. For instance, when in the first mode, the traditional cursor prompt functionalities (e.g., copy, select, move, open, etc.) are applied and/or a traditional cursor menu with the traditional cursor prompt functionalities will be displayed. Notably, these traditional functionalities are not based on a context of a user and do not invoke a remote machine-learning model to perform functions related to the selected content. In contrast, when a user selects content with a cursor prompt that is in an activated second/AI cursor mode, the systems will generate and present a different cursor prompt interface or menu to the user, which includes non-traditional functionalities such as functionality to generate new content that replaces or that is displayed with the selected content and functionality to interact with one or more remote machine-learning models. This dynamic response to user input enhances the flexibility and adaptability of the multi-modal cursor, allowing it to provide a user experience that is tailored to the user's current task or preference.

This ability to switch between the two modes of the multi-modal cursor based on user input provides the user with flexibility and control over their interaction with the user interface and the selectable content. It allows the user to choose the mode that is more suitable for their current task or preference, enhancing the user's experience and efficiency in interacting with the user interface.

FIGS. 1-6 illustrate examples of user interfaces with components of a multi-modal cursor, including cursor icons that can be selected by user input to select and/or switch the cursor mode used by a cursor in the user interfaces to interact with the displayed and selectable content presented within blocks/frames of the user interfaces.

For instance, FIG. 1 illustrates a user interface (or more simply "interface") with an interface control bar/icon ribbon that typically includes icons that can be selected to open corresponding menus or tools and/or to invoke certain functionality. The interface also displays different blocks or frames with different types of selectable content. In this image, a block of selectable image content is provided, as is a block of selectable text content.

The interface also includes a cursor prompt that may be controlled by a mouse or other I/O device to select and interact with the selectable content presented in the different blocks of the interface.

The cursor prompt may be displayed in different formats according to different corresponding cursor modes, as described. The different cursor modes can be selected and switched between in response to user selection of cursor mode icons displayed with the interface. In this embodiment, the cursor mode icons include a traditional or first cursor mode icon, as well as an AI or second cursor mode icon. In this image, the first cursor mode icon has a shape of an arrow and the second cursor mode icon has the shape of a lightning bolt.

Figure 2:
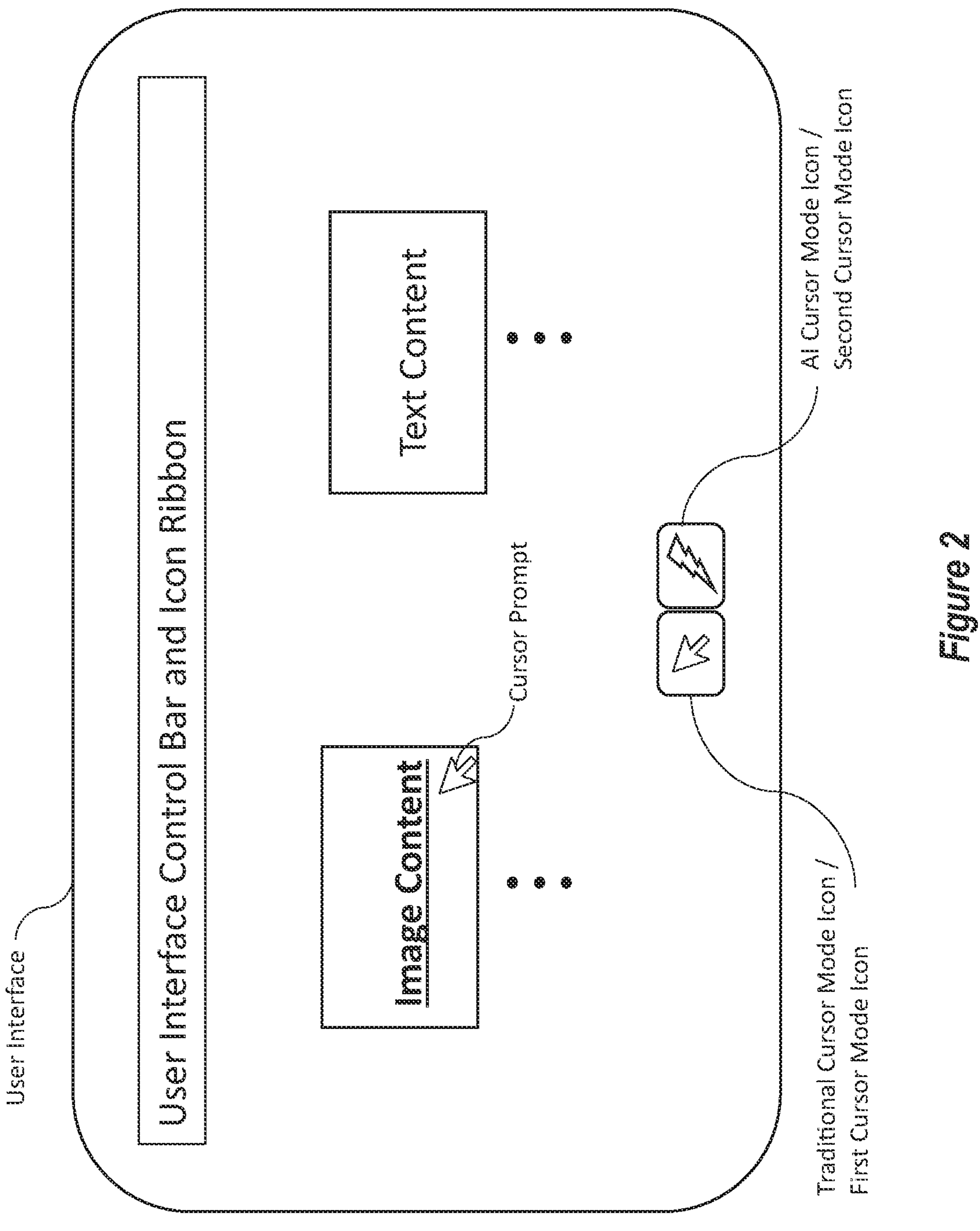

In FIG. 2, when the user selects image content with the cursor prompt, while the corresponding cursor prompt or even more particularly, the cursor/cursor state that corresponds with the cursor prompt is in the tradition cursor mode, the system will cause the cursor to invoke traditional non-contextual functionality associated with the cursor (e.g., select, copy, grab, paste, move, etc.). The image content is bolded in this illustration to show it has been selected.

Figure 3:
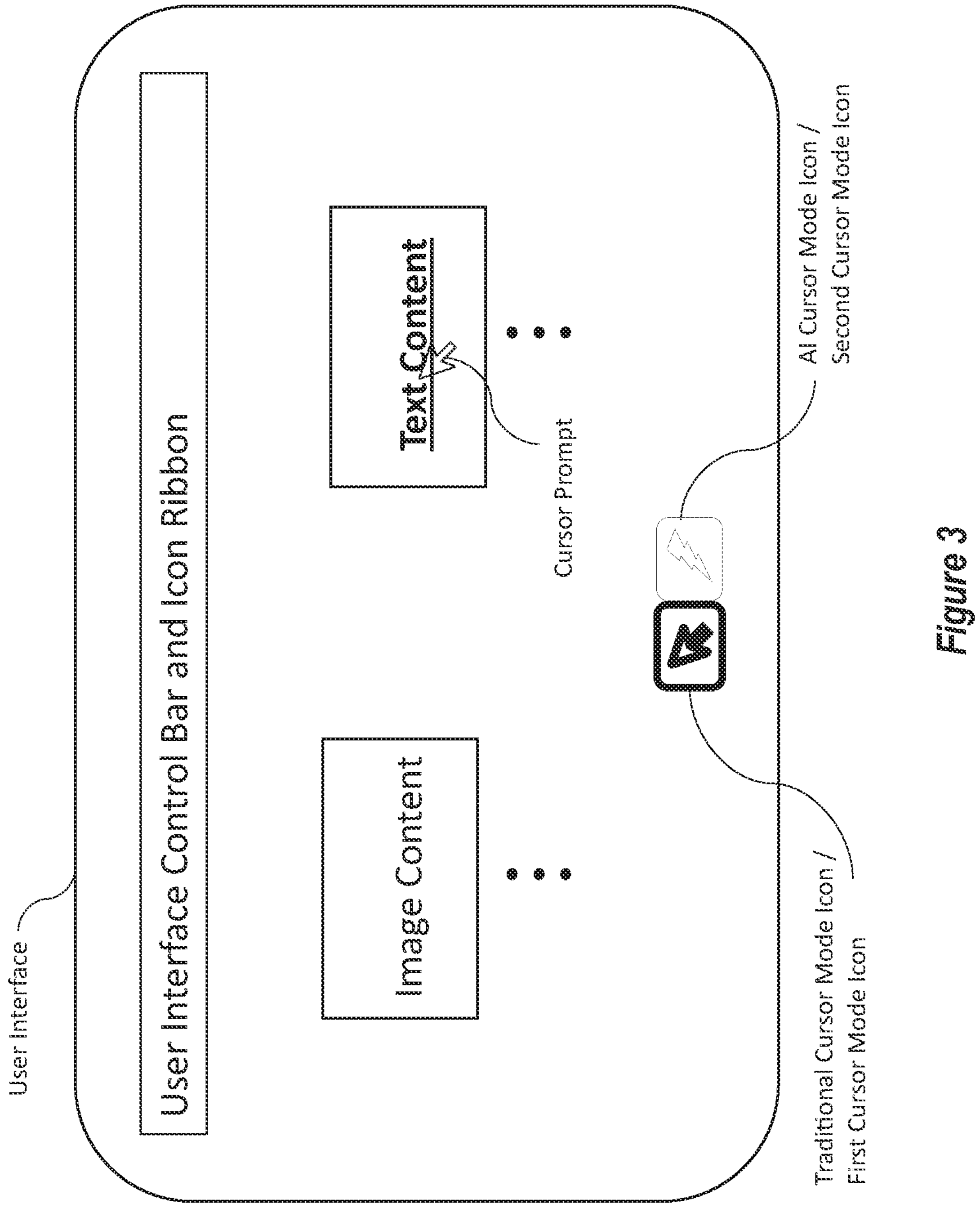

Similarly, in FIG. 3, when the user selects text content with the cursor prompt, while the corresponding cursor prompt or even more particularly, the cursor/cursor state that corresponds with the cursor prompt is in the tradition cursor mode, the system will cause the cursor to invoke traditional non-contextual functionality associated with the cursor (e.g., select, copy, grab, paste, move, etc.). The text content is bolded and underlined in this illustration to show it has been selected.

In FIG. 3, the active mode of the cursor causes the corresponding cursor icon to be visually emphasized and the cursor icon of the inactive cursor mode to be relatively and visually de-emphasized.

Figure 4:
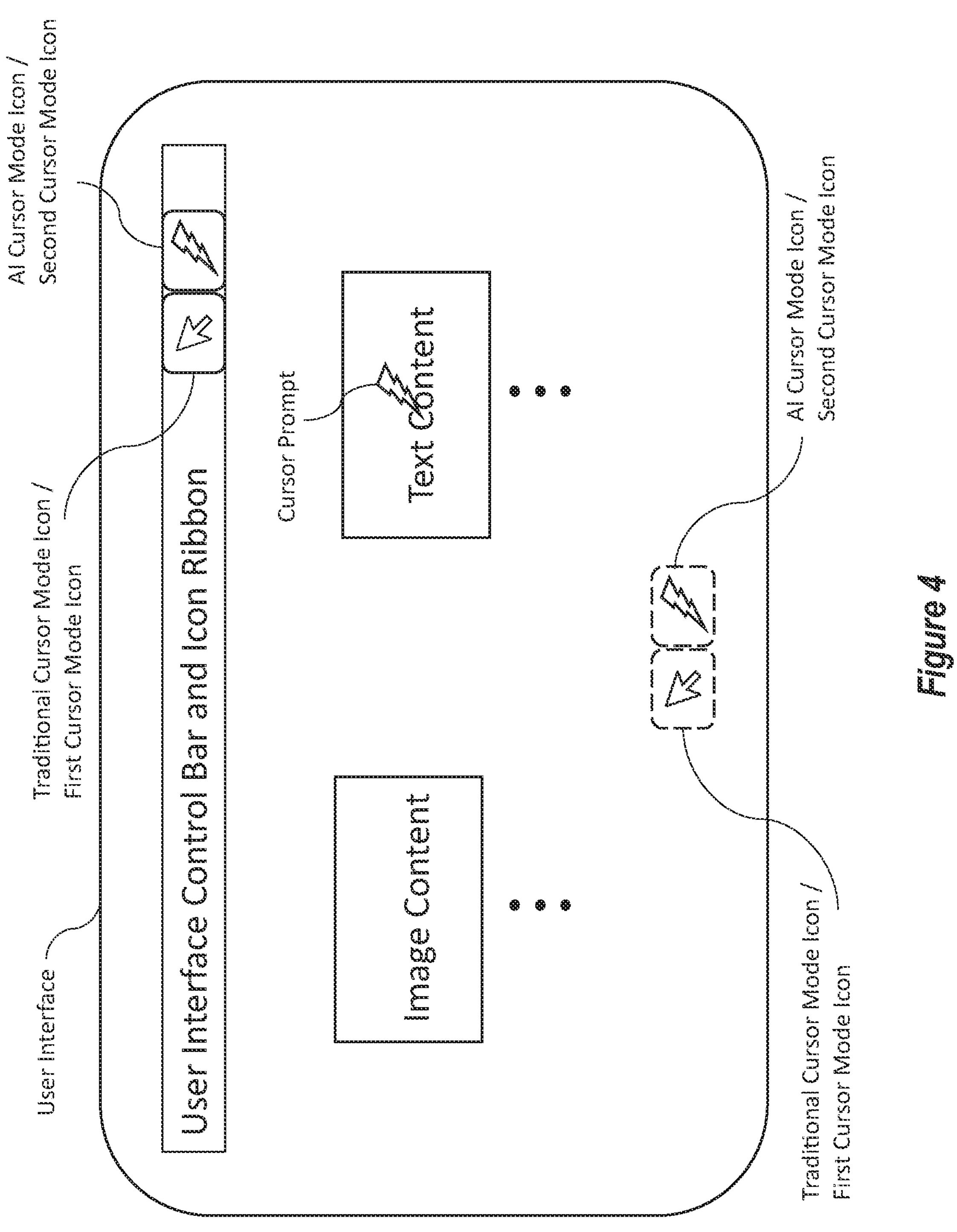

FIG. 4 illustrates how the cursor icons can be displayed at the bottom of the interface or up in the user interface control bar and icon ribbon. They can also be displayed at other locations in the interface. In some instances, not shown, only the cursor icon of the cursor mode that is currently active is displayed, while the other cursor icon of the inactive cursor mode is omitted or hidden from the interface.

In this embodiment, the active cursor mode is the AI or second cursor mode, such that the corresponding cursor prompt is displayed with a matching symbol/object.

Figure 5:
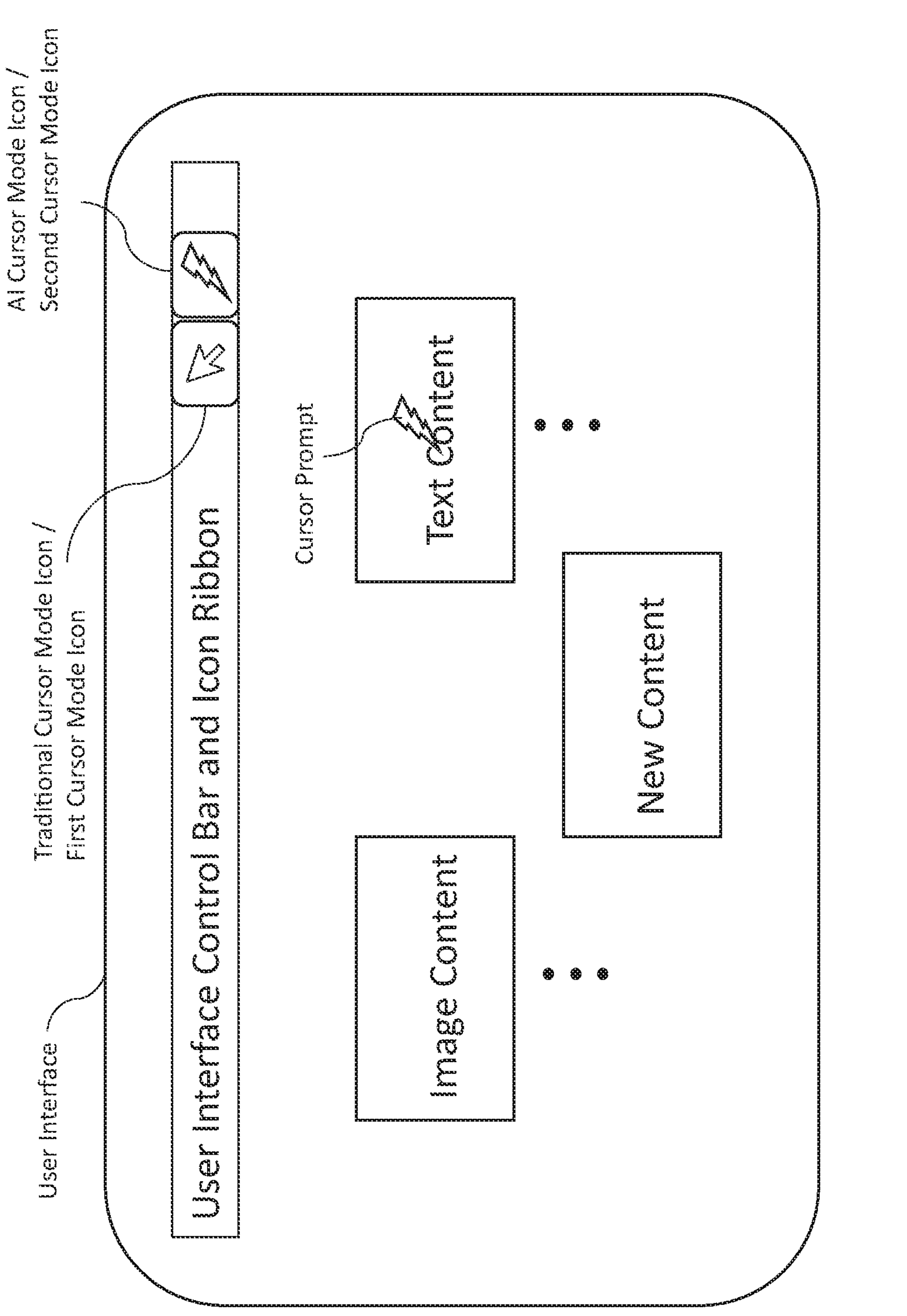

FIG. 5 illustrates how selection of the text content from FIG. 4 with the cursor prompt while in the AI or second cursor mode, or more particularly the cursor/cursor state associated with the cursor prompt is in the AI or second cursor mode, then the system will cause a selected function and corresponding model or executable to be applied to the selected content to generate new content that is displayed in the interface with the selected content (FIG. 5).

Figure 6:
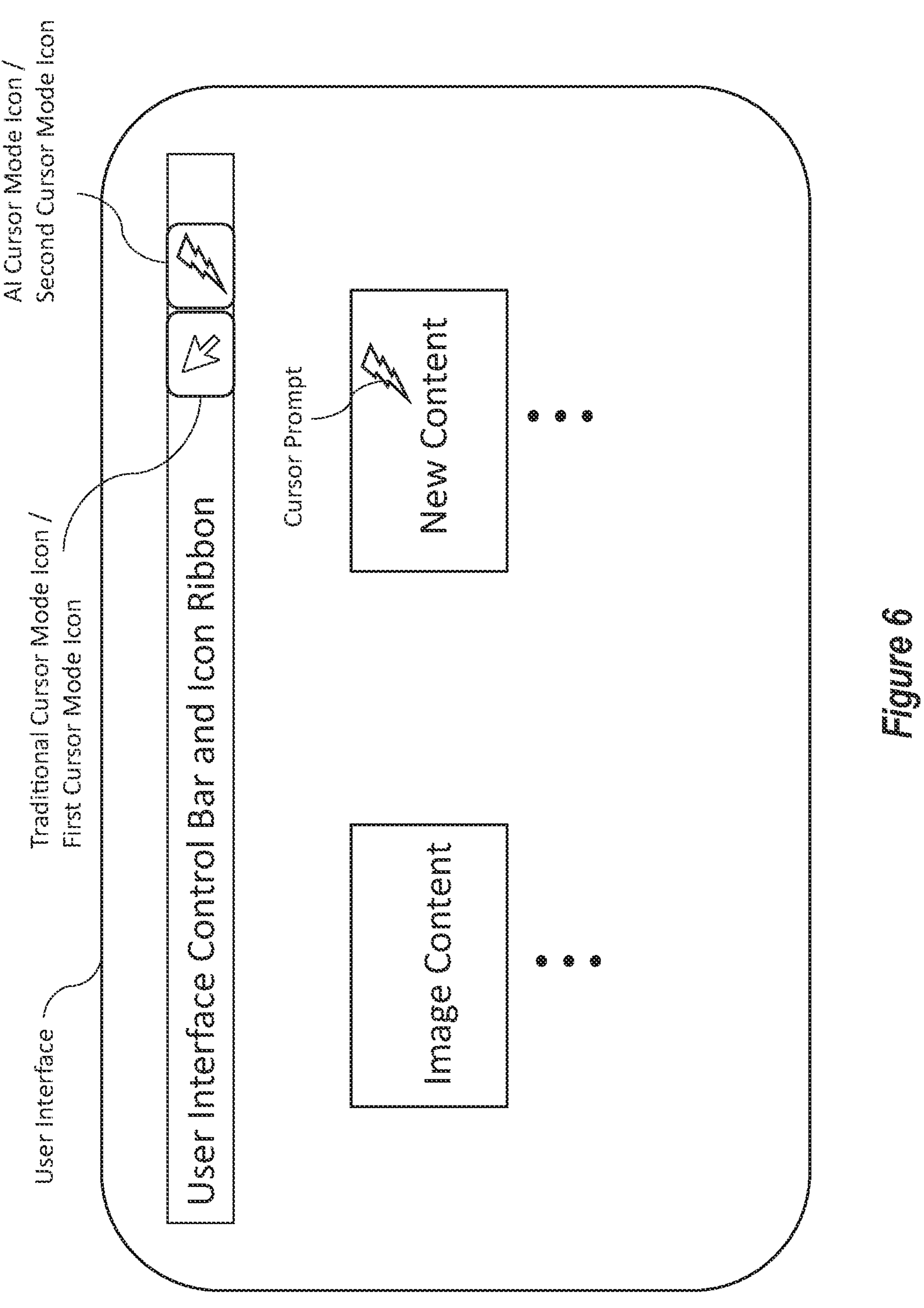

Additionally, or alternatively, this selection may also cause the system to select one or more functions to perform a transformation of the selected content into new content that replaces the selected content (FIG. 6).

In another example, the selection of the content causes the generation of an AI cursor widget (referred to herein as simply an AI cursor, or AI cursor interface, or AI cursor prompt interface) that includes one or more interactive AI tools. These tools may include, for example, an AI prompt field to receive a prompt which, when populated, causes the entered prompt to be submitted to an LLM (large language mode), such as a GPT (generative predictive text) model or another model that processes the prompt to generate output that is rendered at the interface. The AI tools may also include an attachment icon or control which, when selected, provides the user options to attach one or more files to be considered and processed by the model as a stand-alone prompt or with the entered prompt. The AI tools may also include a selectable object (e.g., generate icon) which, when selected, provides options to the user for generating charts, comparisons, derivative content, and/or other processed outputs related to the selected content.

Notably, in each of these examples, the system considers a context of the user and/or application instance (which may comprise the selected content and content type) when selecting a function (e.g., executable) and/or model from a plurality of different functions that the system has access to and that can be applied to the selected content. The system may selectively filter and display only functions/functionalities that are determined to be contextually relevant to the user and/or application instance, and optionally, while omitting other available functionalities that are determined to not be as contextually relevant.

Figure 7:
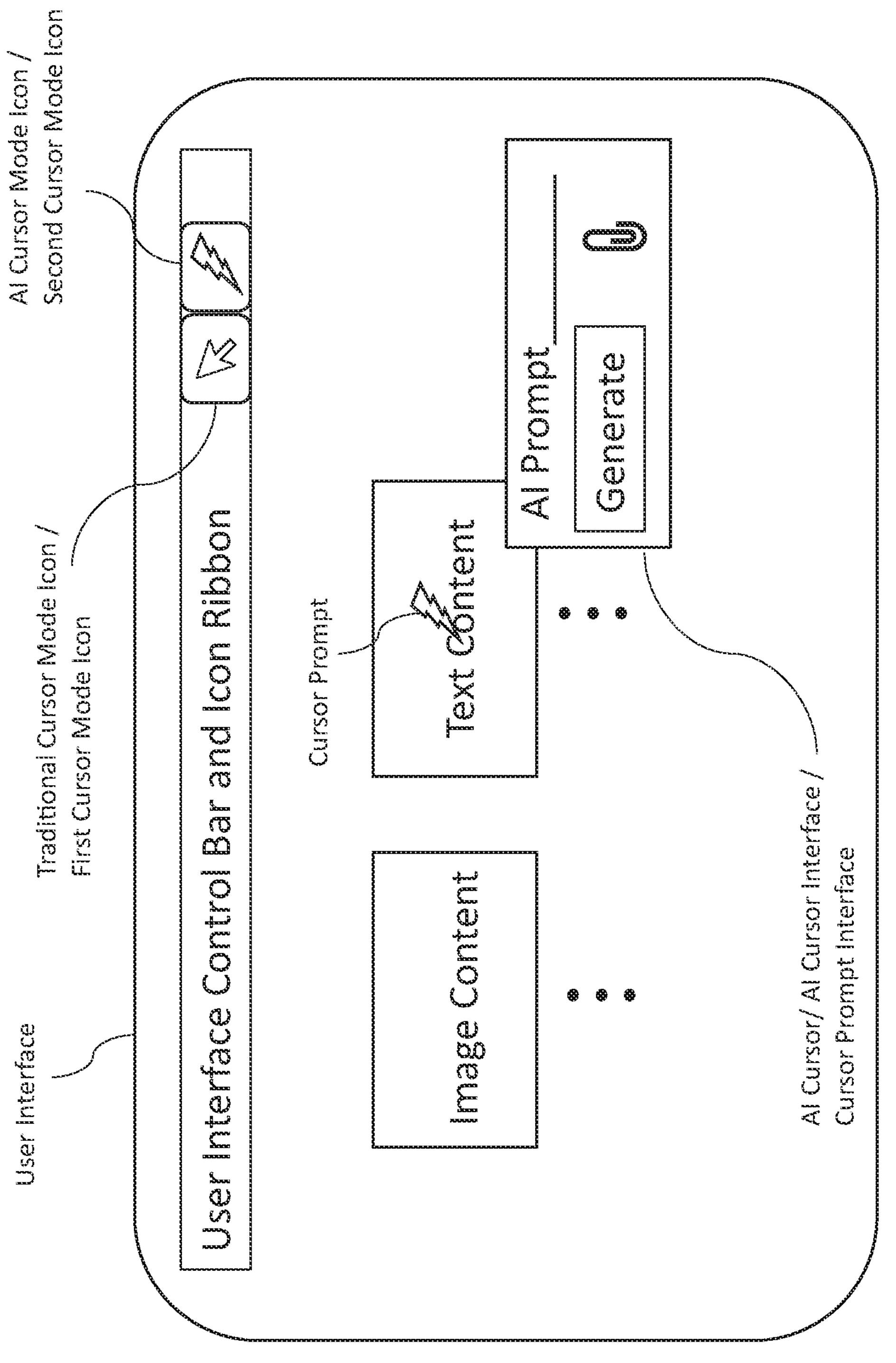
FIGS. 7-12 illustrate examples of user interfaces which include cursor prompt interfaces that are configured to facilitate multiple functionalities and techniques for interacting with content selected by the corresponding cursor prompts.

FIG. 7 illustrates an AI cursor interface (also referred to herein as an AI cursor or cursor prompt interface) that is generated in response to the user selecting content with the cursor prompt when the cursor prompt is in the AI cursor mode, as shown. This AI cursor interface includes functions or functionalities that are identified and selected for the AI cursor interface based on various factors, including at least a context of the user interface and/or selected content and/or the user context, as described herein. In this regard, the presentation of the AI cursor interface may appear different to different users that are using different applications.

In some instances, the system considers the contexts of the user and user interface when selecting the particular back-end models and functions that are applied, even though the functionalities presented in the AI cursor interface may remain the same or static between different uses. In this scenario, the options to add an AI prompt in an AI prompt field will be the same in multiple presentations of the AI cursor interface. However, when the prompt is entered, the system will access different model(s) or functions to apply to the prompt based on the referenced contexts, such that different users may enter the same prompt in different instances of the user interface, but the system will apply different models to the same prompt because of the detected different contexts of the user interface and/or user.

Figure 8:
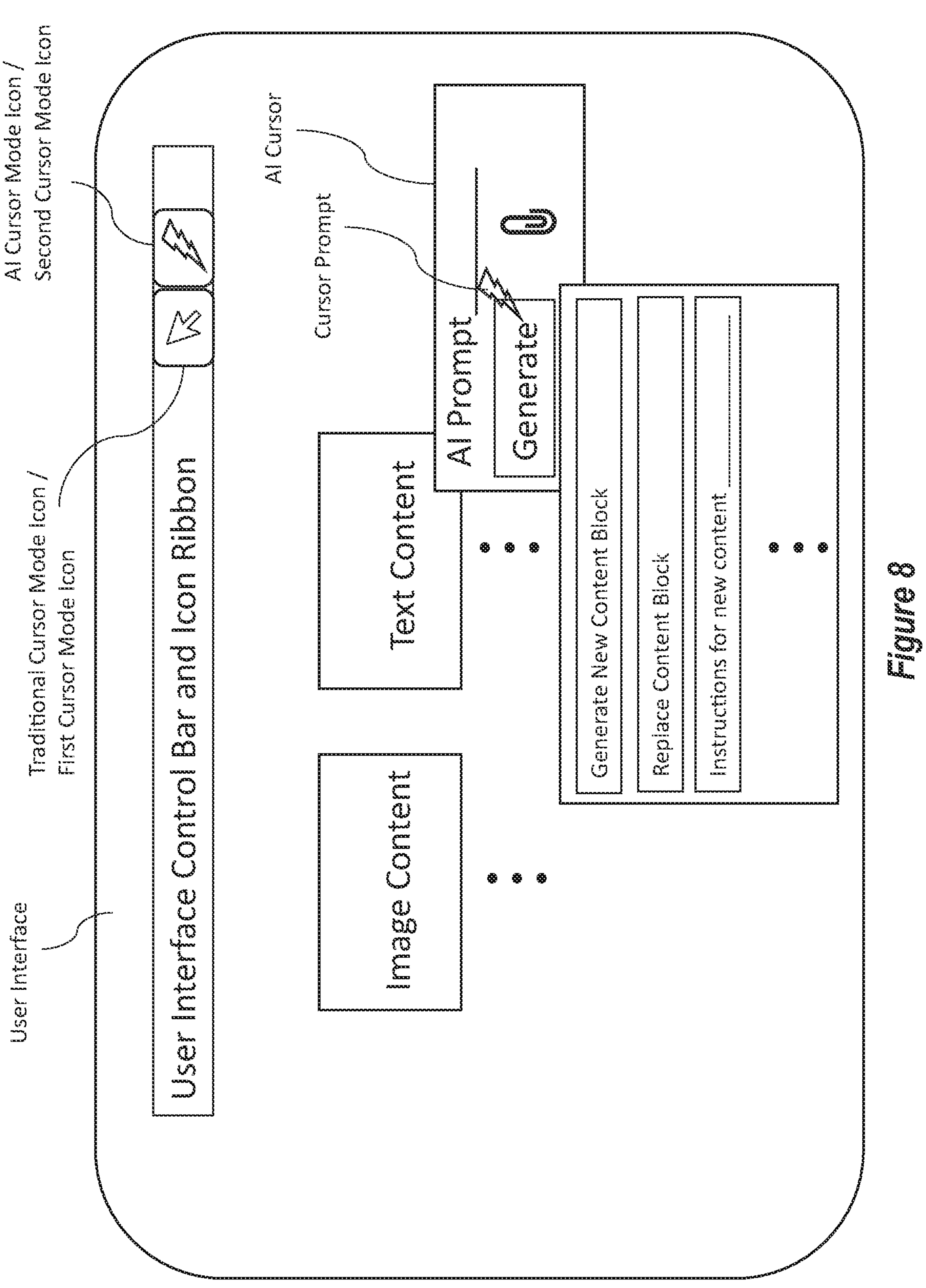

FIG. 8 illustrates the selection of a function called "generate" from the cursor and which causes the system to present a content generation interface with selectable options which, when selected, cause the system to generate new content, such as in a new content block or to generate new content that is used to replace the selected content/content block. The system may also have an input field for receiving a prompt for instructions related to the generating the content and that the model is applied to generate the new content in the manner desired and/or sourced from a desired source, for example.

Figure 9:
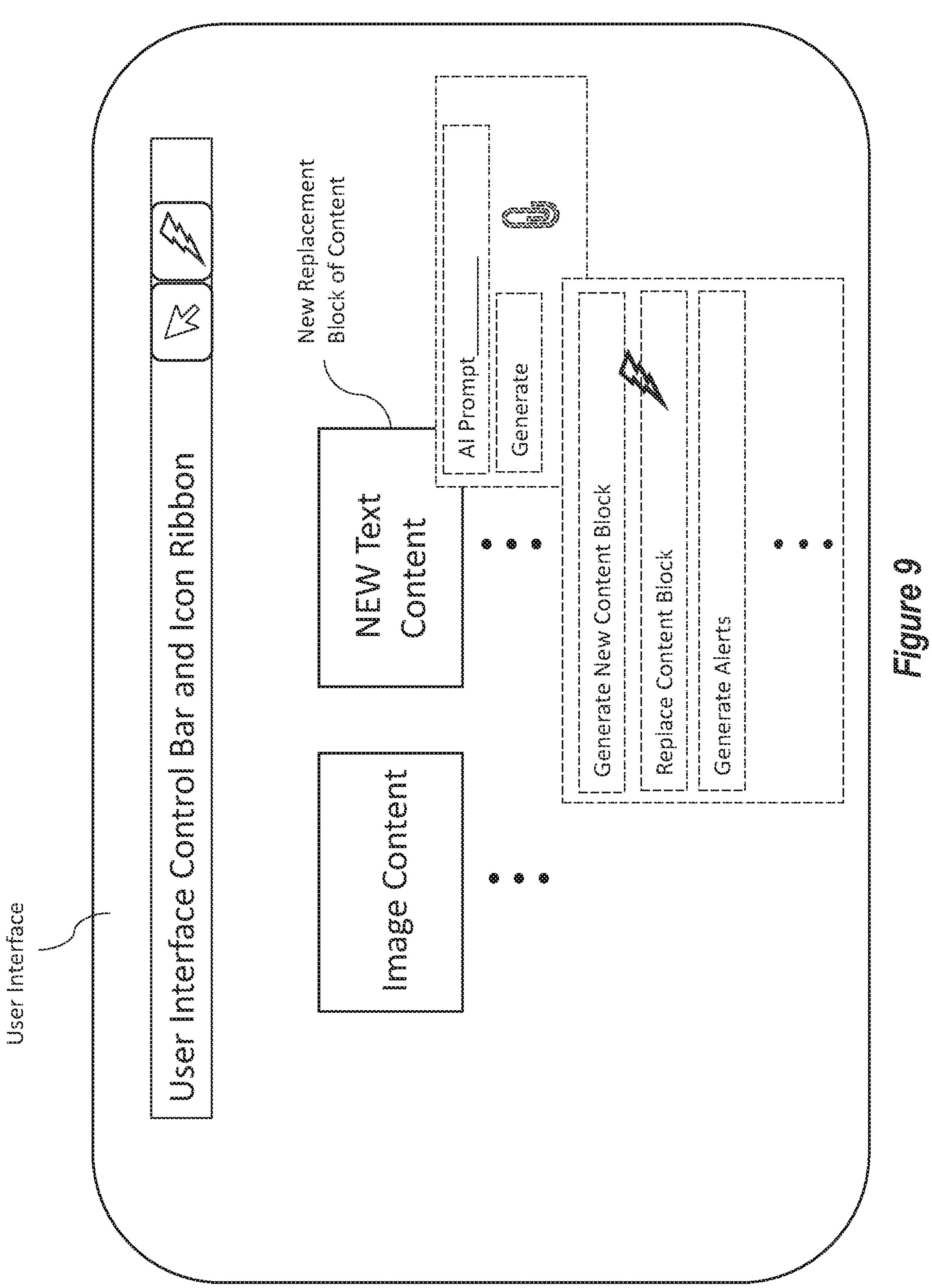

FIG. 9 illustrates a related example in which the user has selected a replace content block option and the interface is displaying the NEW Text Content in the position where the selected content was previously presented. This illustration also shows an option for generating alerts that was provided by the system automatically or that the user entered as a prompt for causing the system to generate notifications to the user when certain conditions exist within the NEW Text Content, such as when a source that the NEW Text Content was derived from is updated.

Figure 10:
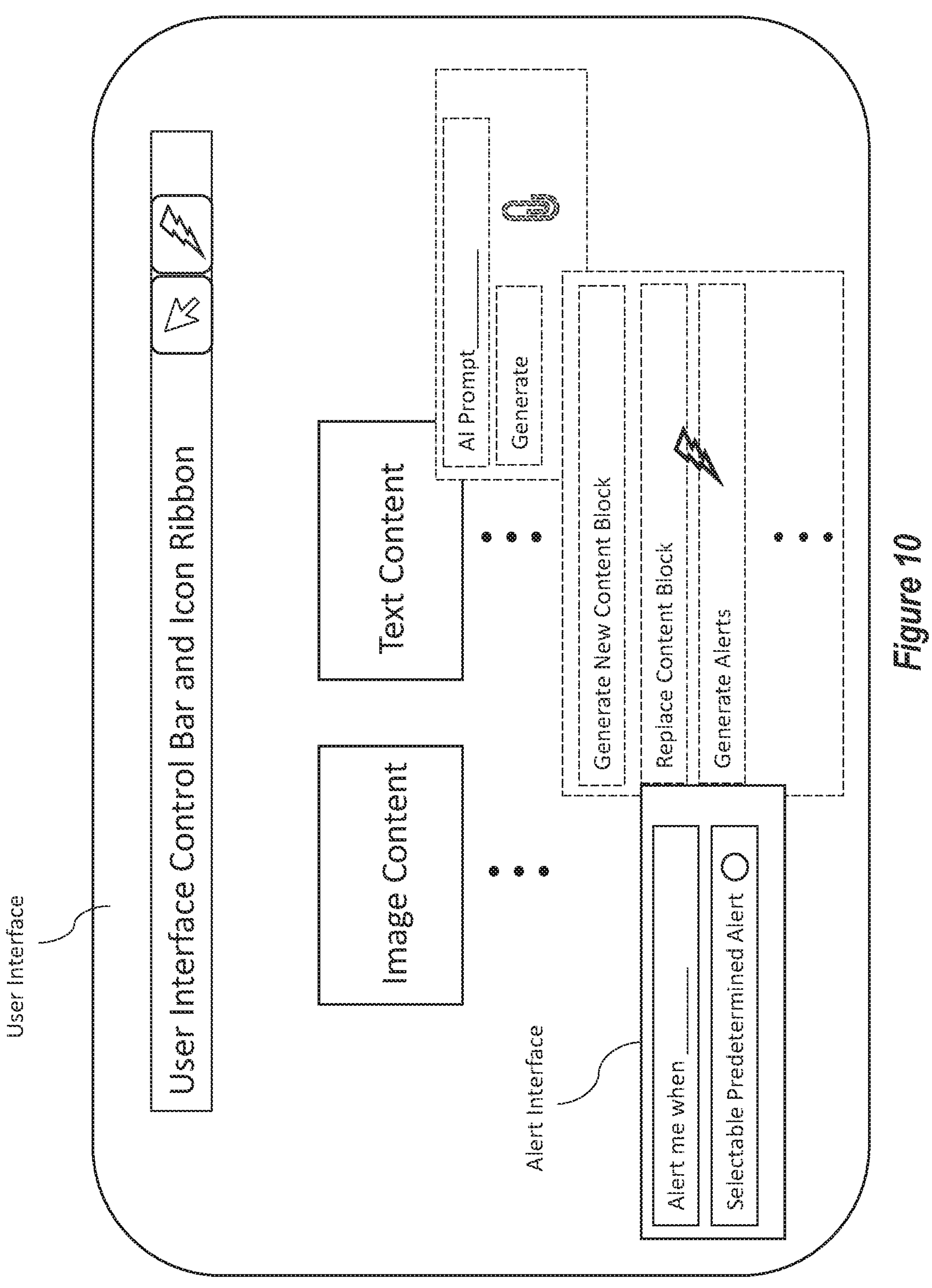

FIG. 10 illustrates an example in which a user has selected the generate alert option to cause the system to generate a new alert interface with separate options that can be entered or selected for generating alerts related to the selected content and/or the newly generated content.

Figure 11:
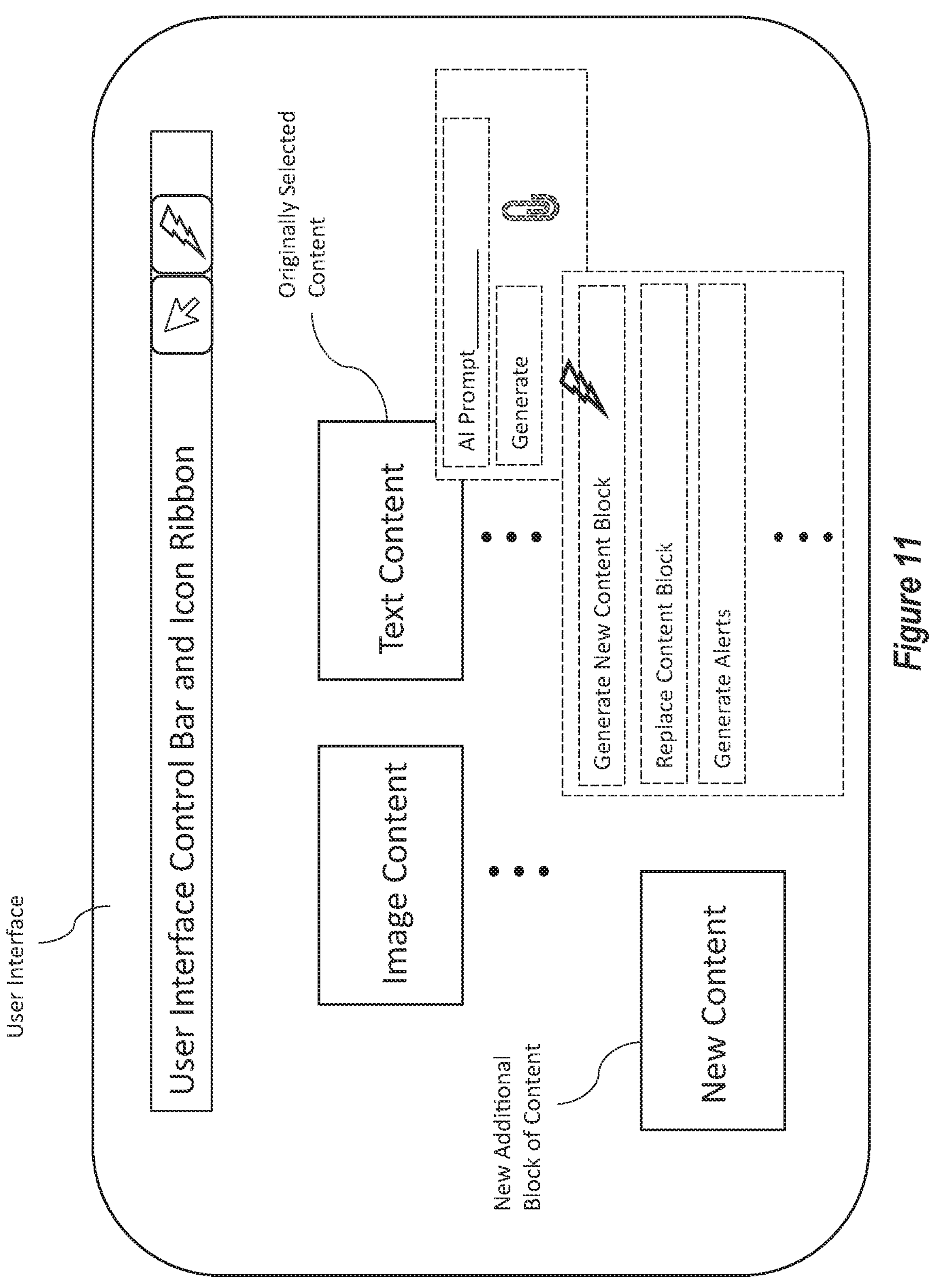

FIG. 11 illustrates an example in which a user has selected an option to generate a new content block for new content related to the originally selected content. In this example, the new content is displayed concurrently or simultaneously with the originally selected content.

Figure 12:
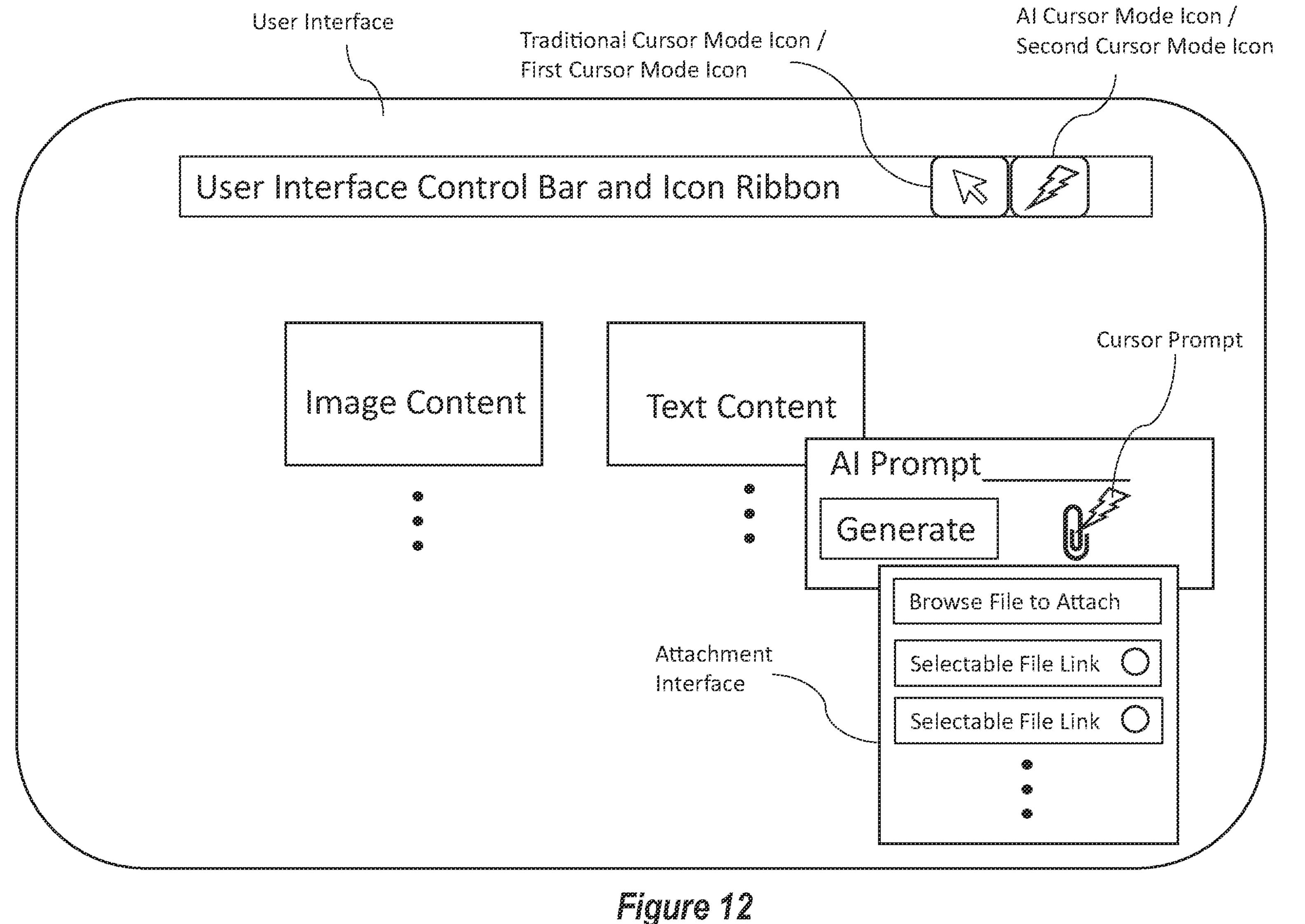

FIG. 12 illustrates an example in which a user selects an attachment icon that, when selected, causes the system to display an attachment interface with options for selecting or entering a file or source of information to be used when performing a function to or with the selected content which was previously selected.

Figure 13:
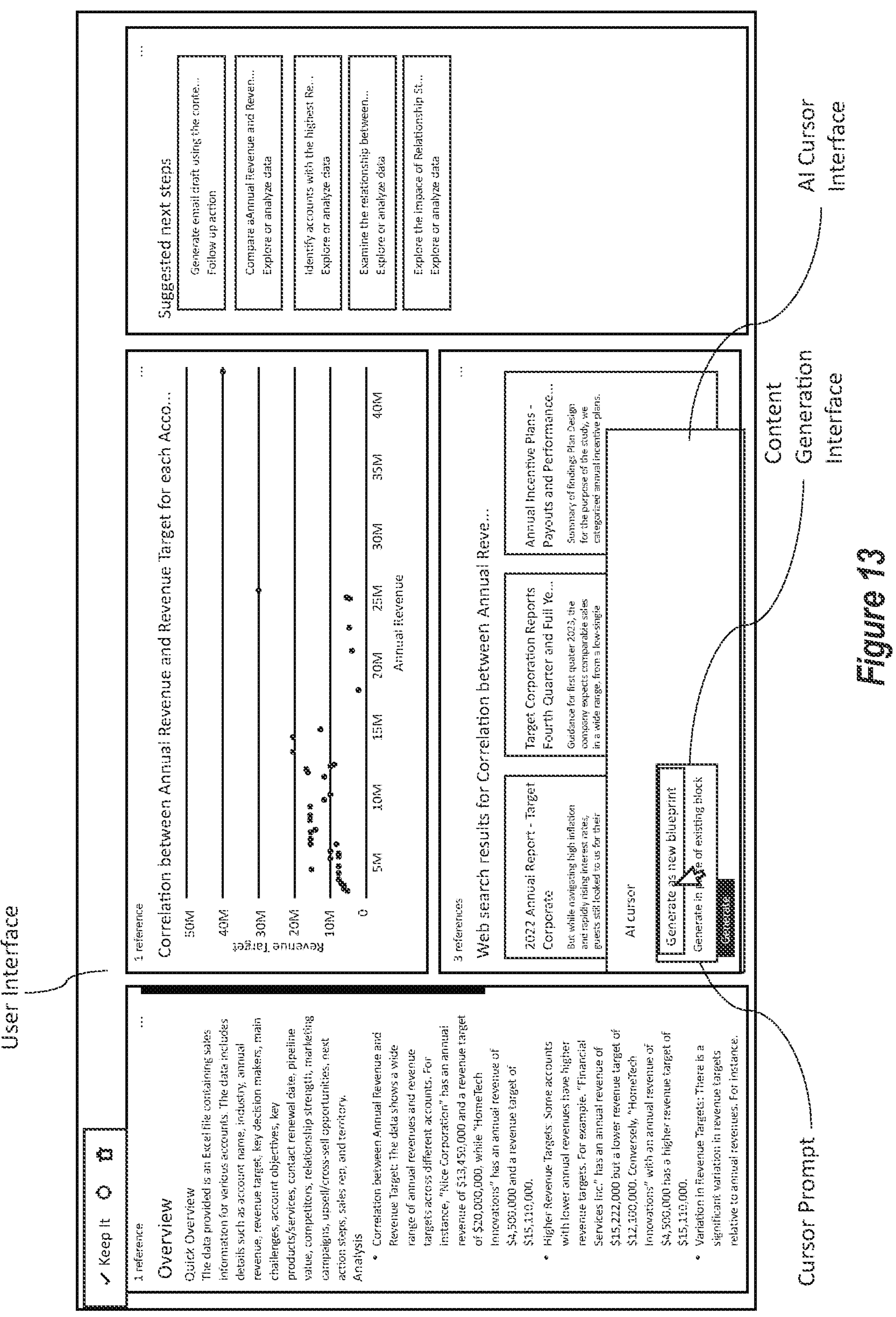
FIGS. 13-16 illustrate additional examples of user interfaces that include the use of cursor prompt interfaces, such as described in FIGS. 7-12.
Figure 14:
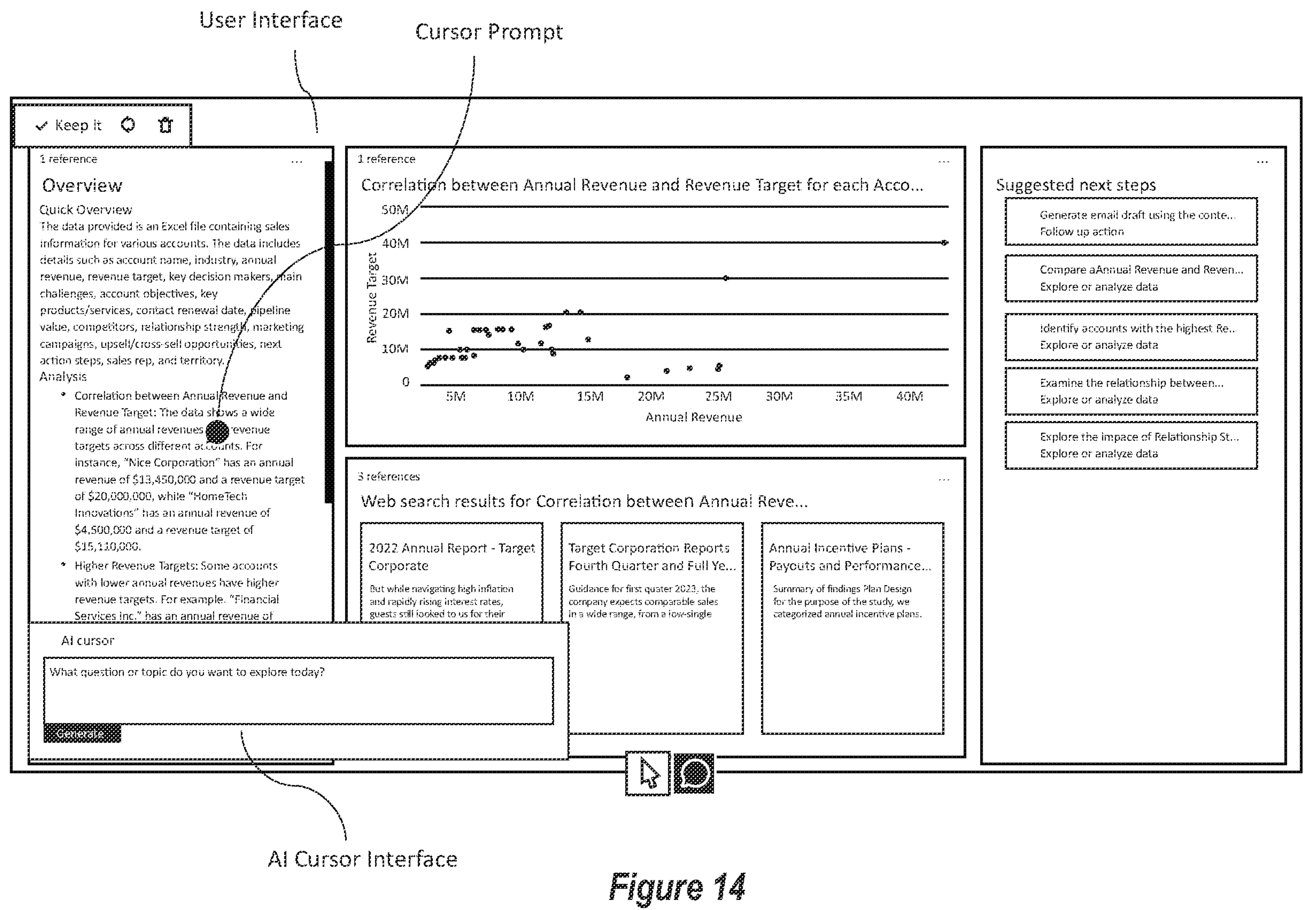
Figure 15:
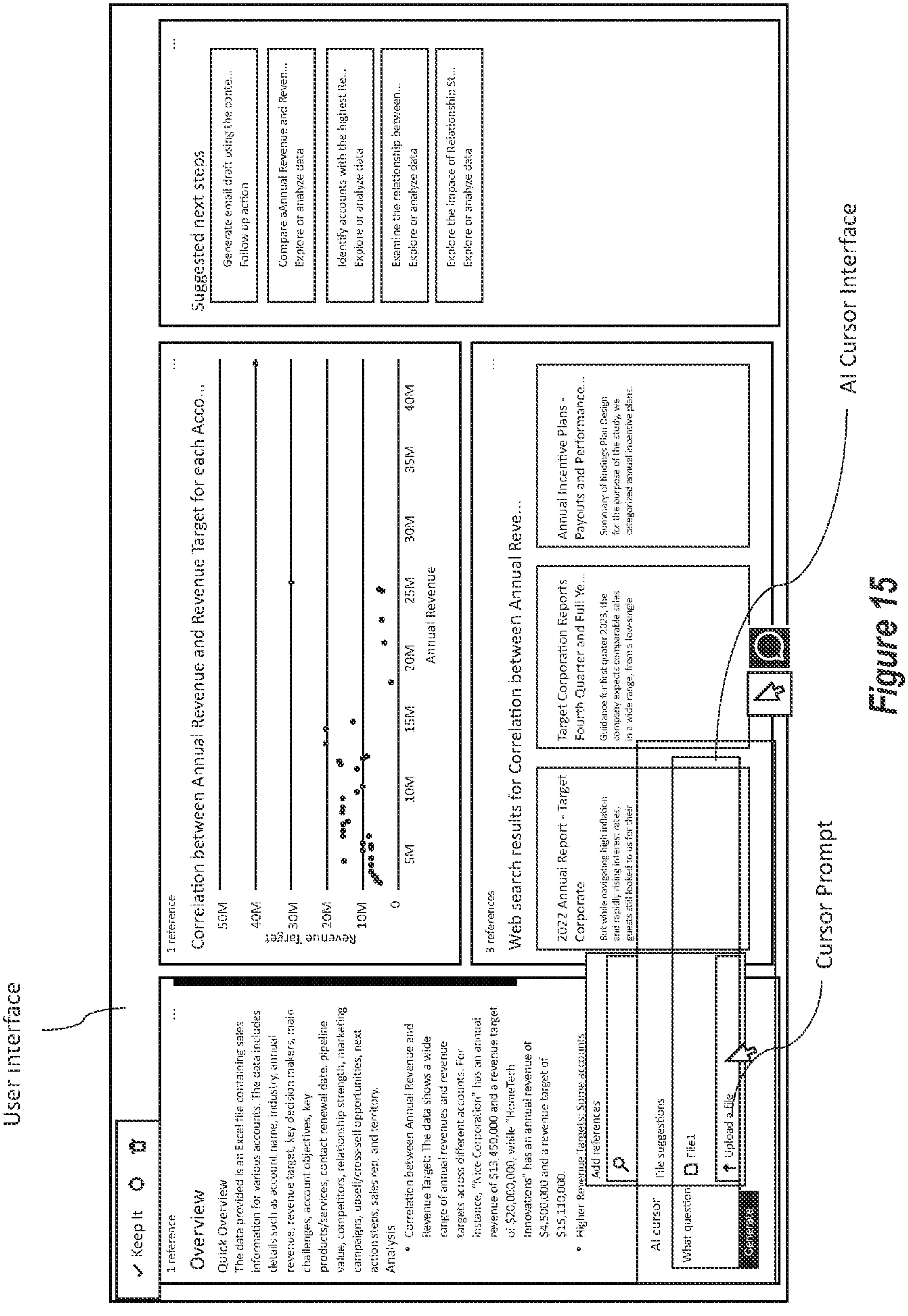

FIGS. 13-15 illustrate related embodiments in which a cursor prompt is used to select a generate new content option from a content generation option/interface from the base AI cursor interface (FIG. 13), wherein the cursor prompt is used to select content to trigger the generation of the AI cursor interface with a prompt field that is configured to receive a user entered prompt that a large language model (LLM) or other model trained to process similar prompts will be applied to (FIG. 14).

FIG. 15 also illustrates similar elements and functionality. However, in FIG. 15, the cursor prompt has changed a shape relative to a previous shape used to invoke the generation of the AI cursor interface. This is beneficial to help the user intuitively know they are interacting within the AI cursor interface. When the cursor prompt exits the boundaries of the AI cursor interface, it reverts to the shape of the cursor prompt in the AI cursor mode or the traditional cursor mode.

FIGS. 16-21 illustrate additional examples of user interfaces with components of a multi-modal cursor. In these examples, the AI or second cursor mode icon is presented as a circle with a small arrow protruding from the circle. The traditional or first cursor mode icon is presented as a traditional arrow icon.

Figure 16:
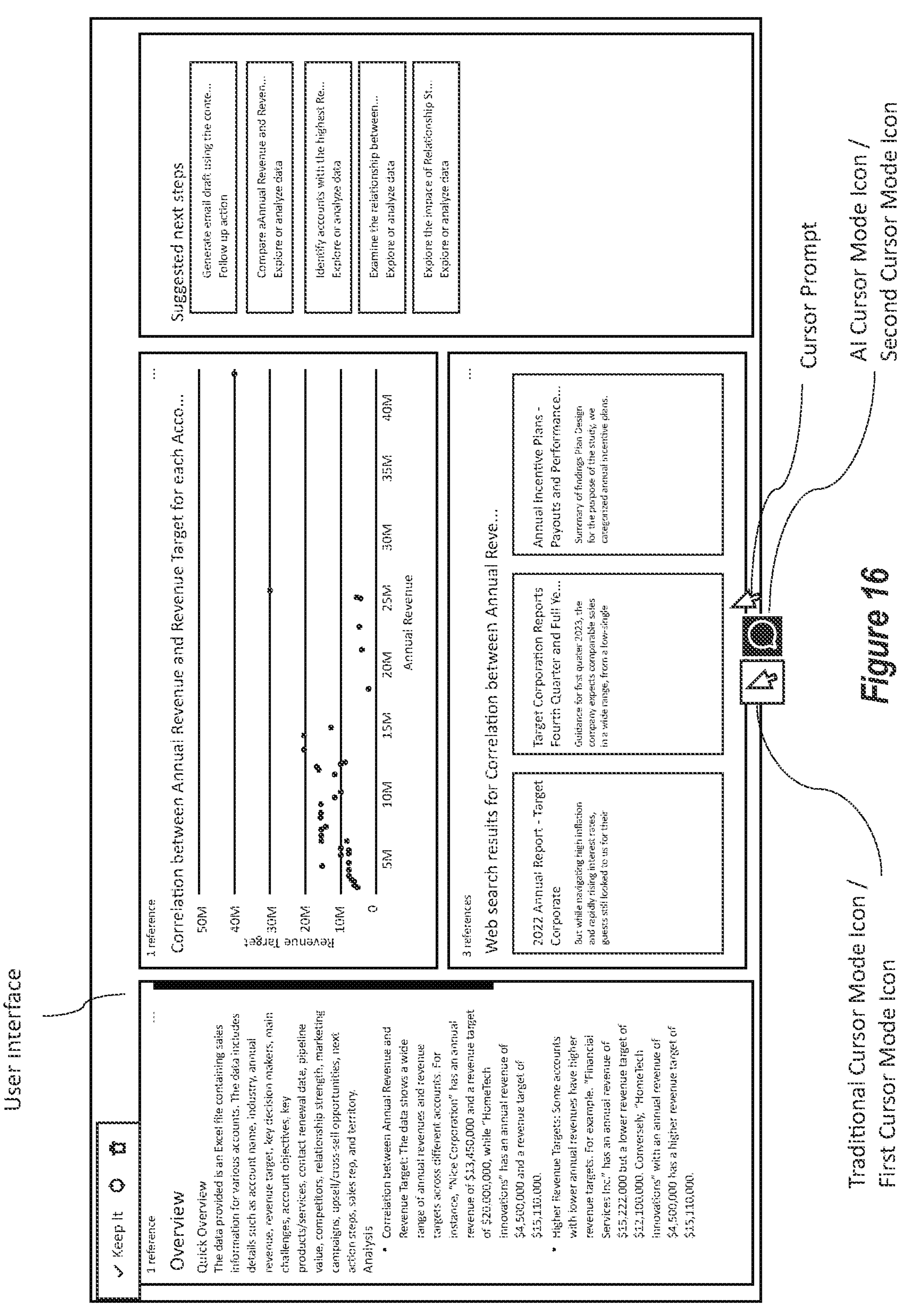
Figure 17:
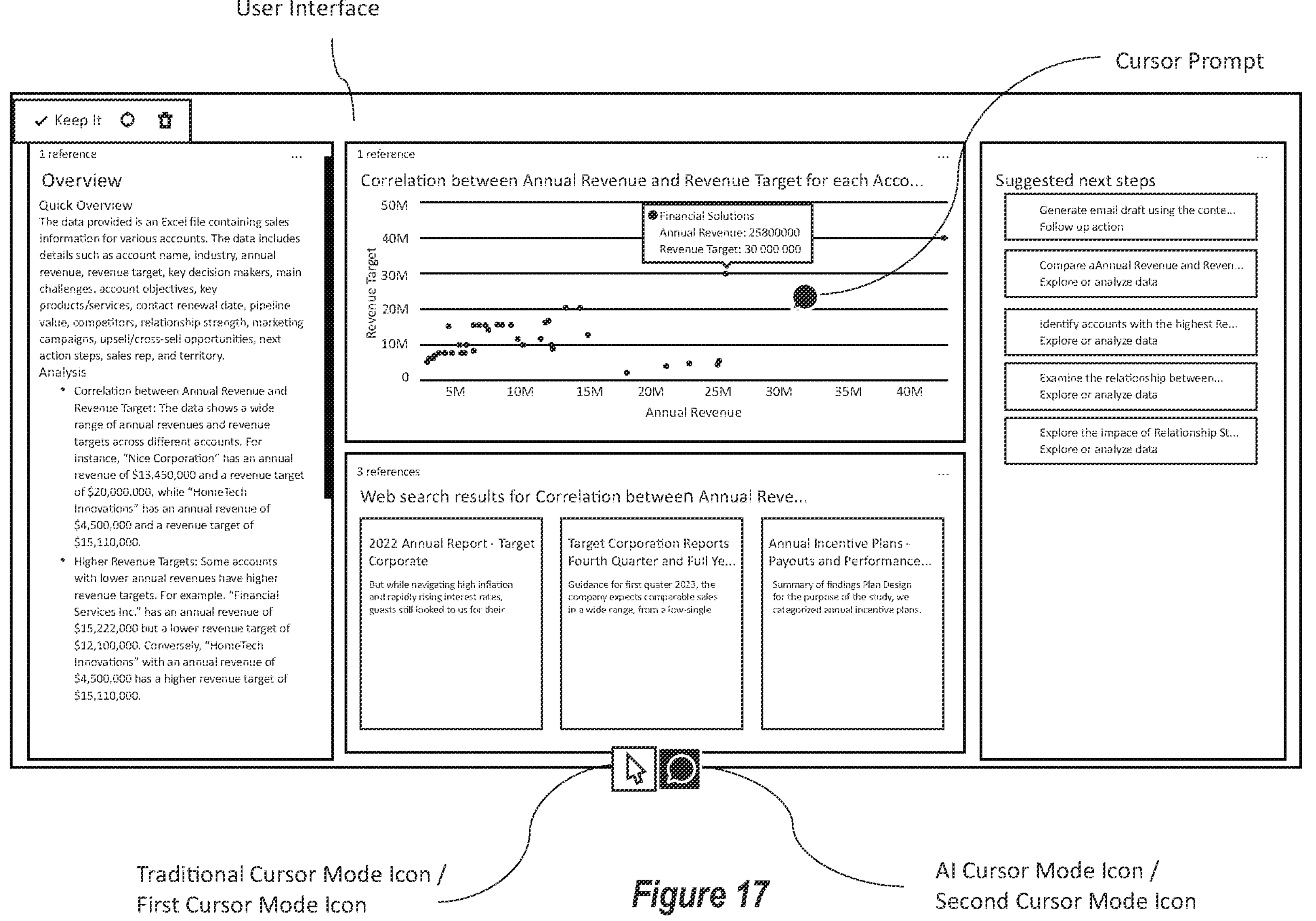
Figure 18:
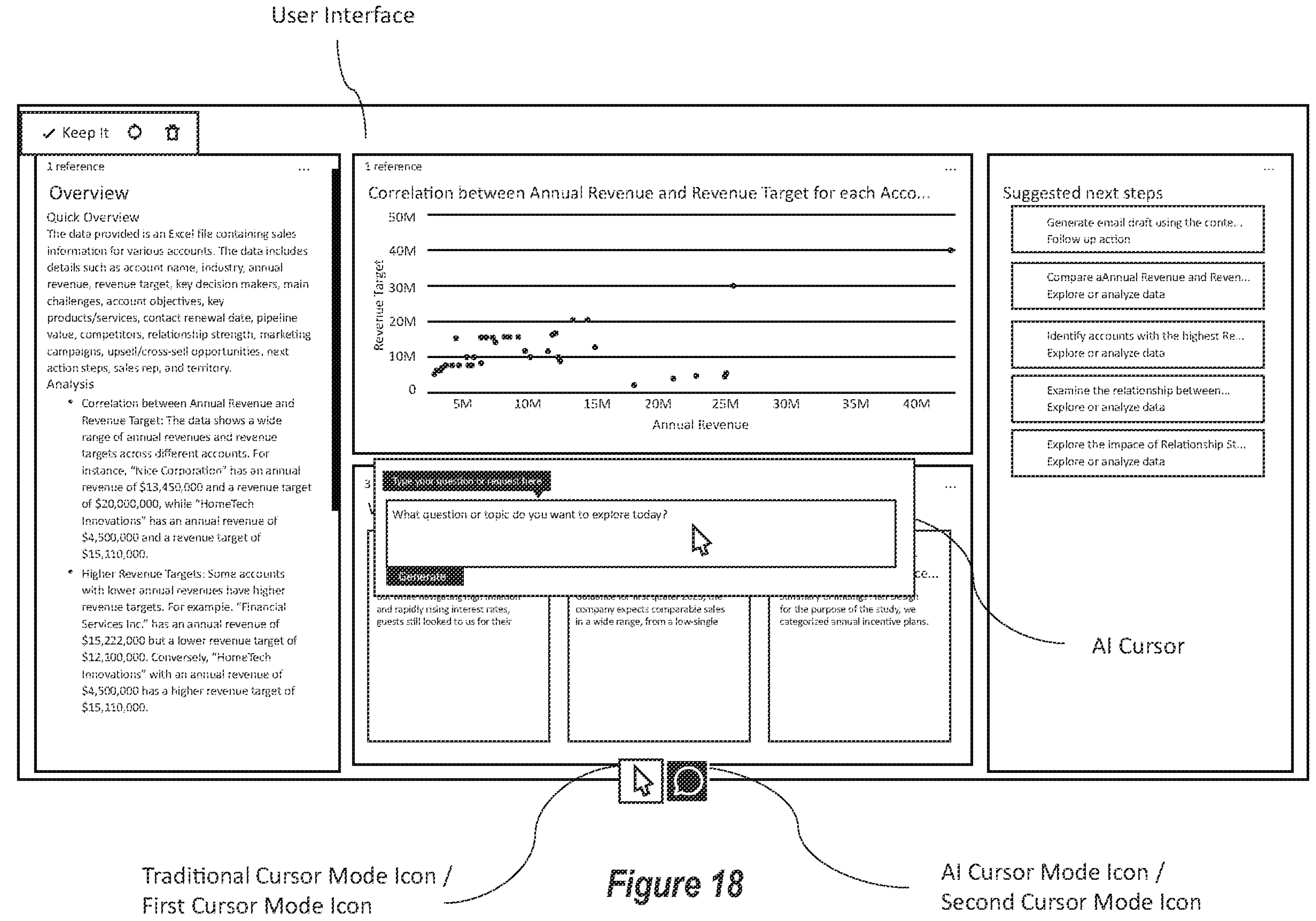
Figure 20:
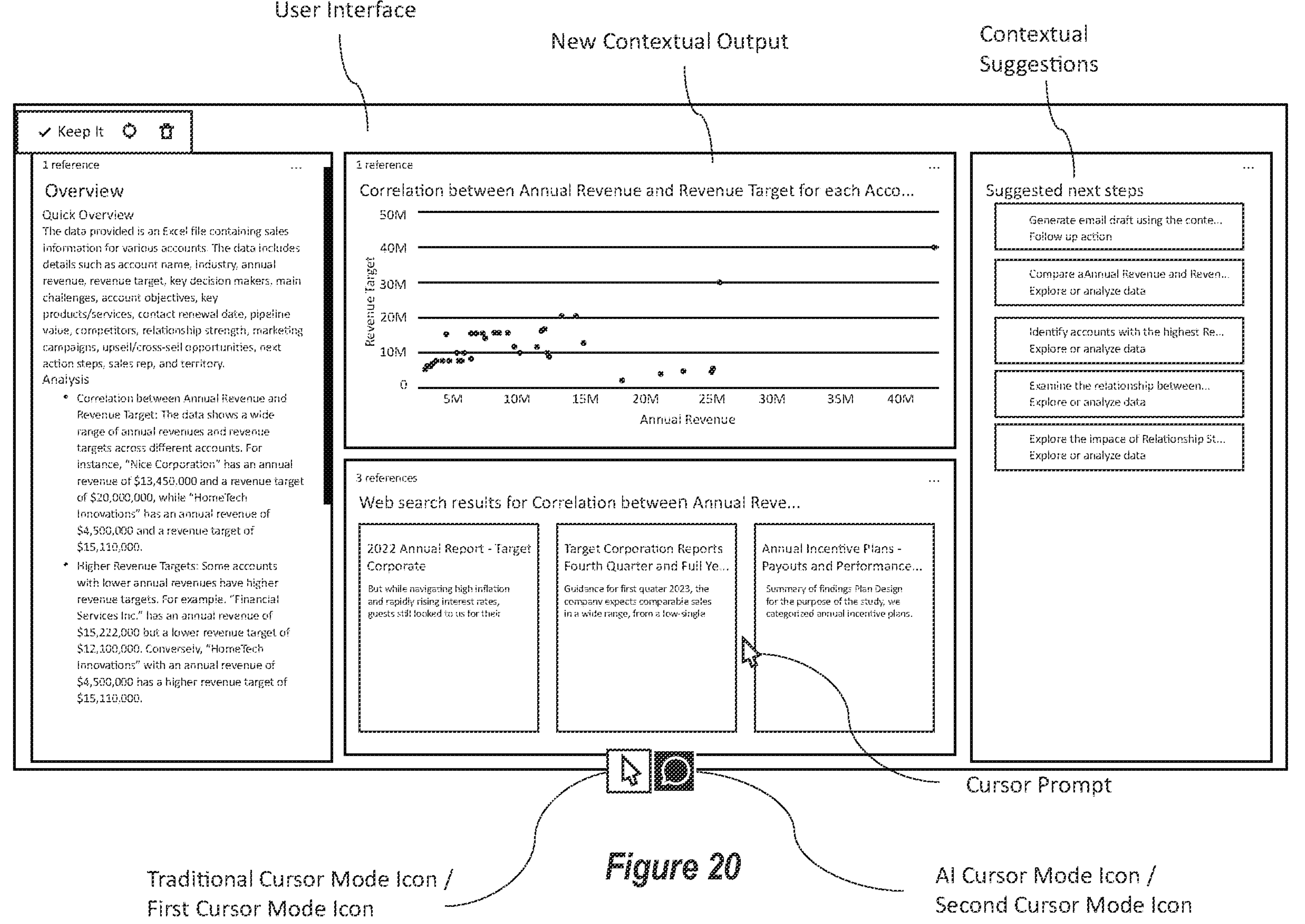

These illustrations also show different types of content presented in different blocks of the user interface, along with a cursor prompt. In FIG. 16, the cursor prompt is the shape of an arrow, corresponding to a selected state of the cursor and the corresponding first cursor mode icon. In FIG. 17, the cursor prompt is the shape of a modified circle with a point/arrow, corresponding to a selected state of the cursor and the corresponding second cursor mode icon. In FIG. 20, the cursor prompt is the shape of an arrow, corresponding to a selected state of the cursor and the corresponding first cursor mode icon.

Figure 19:
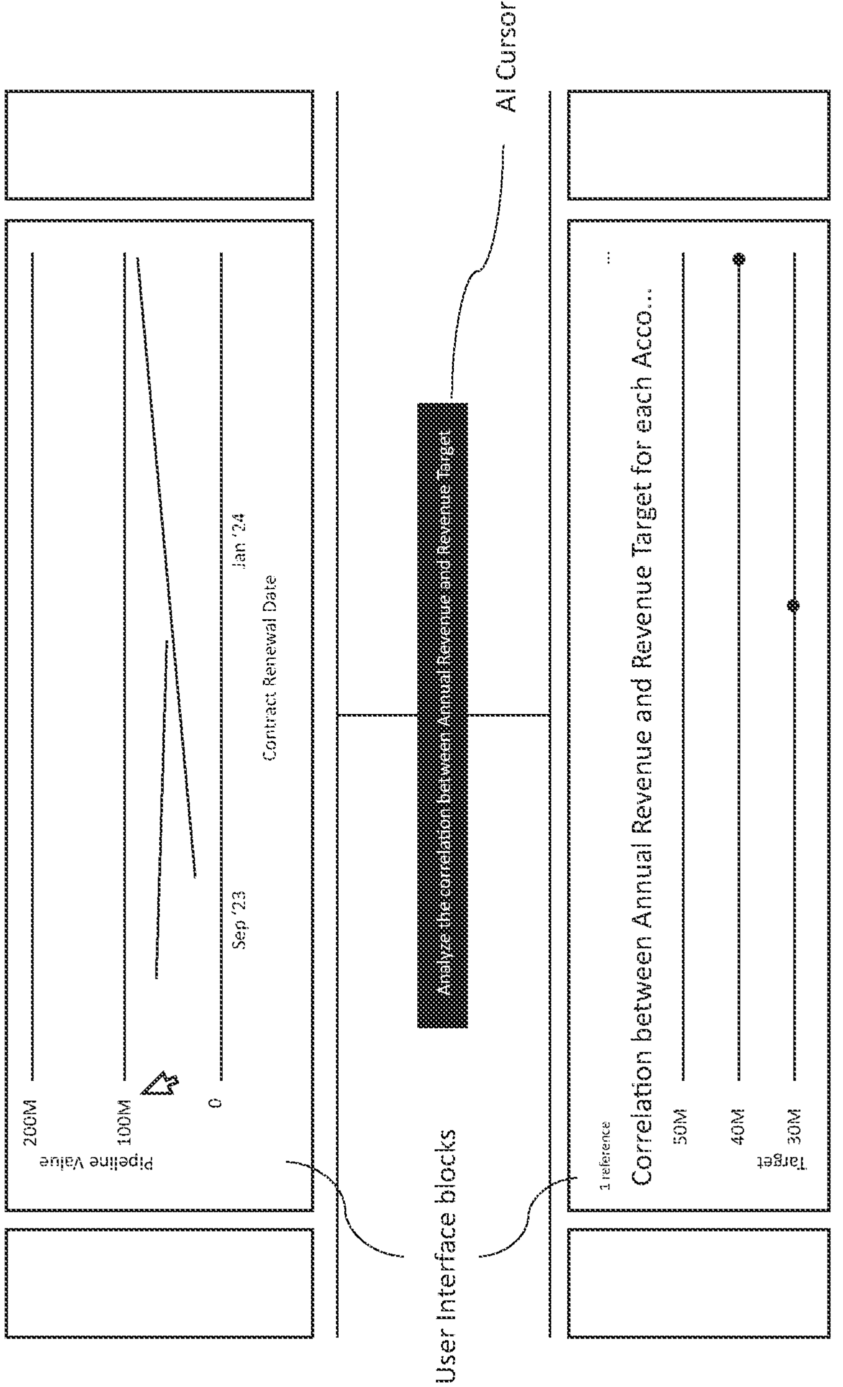

In FIG. 19 the system has received the selection of two different blocks of the interface with the cursor prompt while the second cursor mode state is activated. This caused an AI cursor interface to be displayed with interactive AI tools for processing the content of the selected interface blocks (not shown). As a result of a user selection of an AI tool for causing a comparison of selected content (not shown) or in response to a user typing a prompt, the AI cursor interface is changed to reflect the prompt/functionality to be applied to the content in the selected interface blocks (i.e., an analysis of correlations between annual revenue and revenue targets identified within the selected interface blocks).

The selection of this functionality may be based on considerations of the interface context (e.g., the content being displayed and selected) and/or based on the user context (e.g., the role/title of the user as an accountant for the company and/or a detected event to submit a report on the correlations between annual revenue and revenue targets as identified from the user's stored and referenced calendar event data and/or meeting notes).

Figure 21:
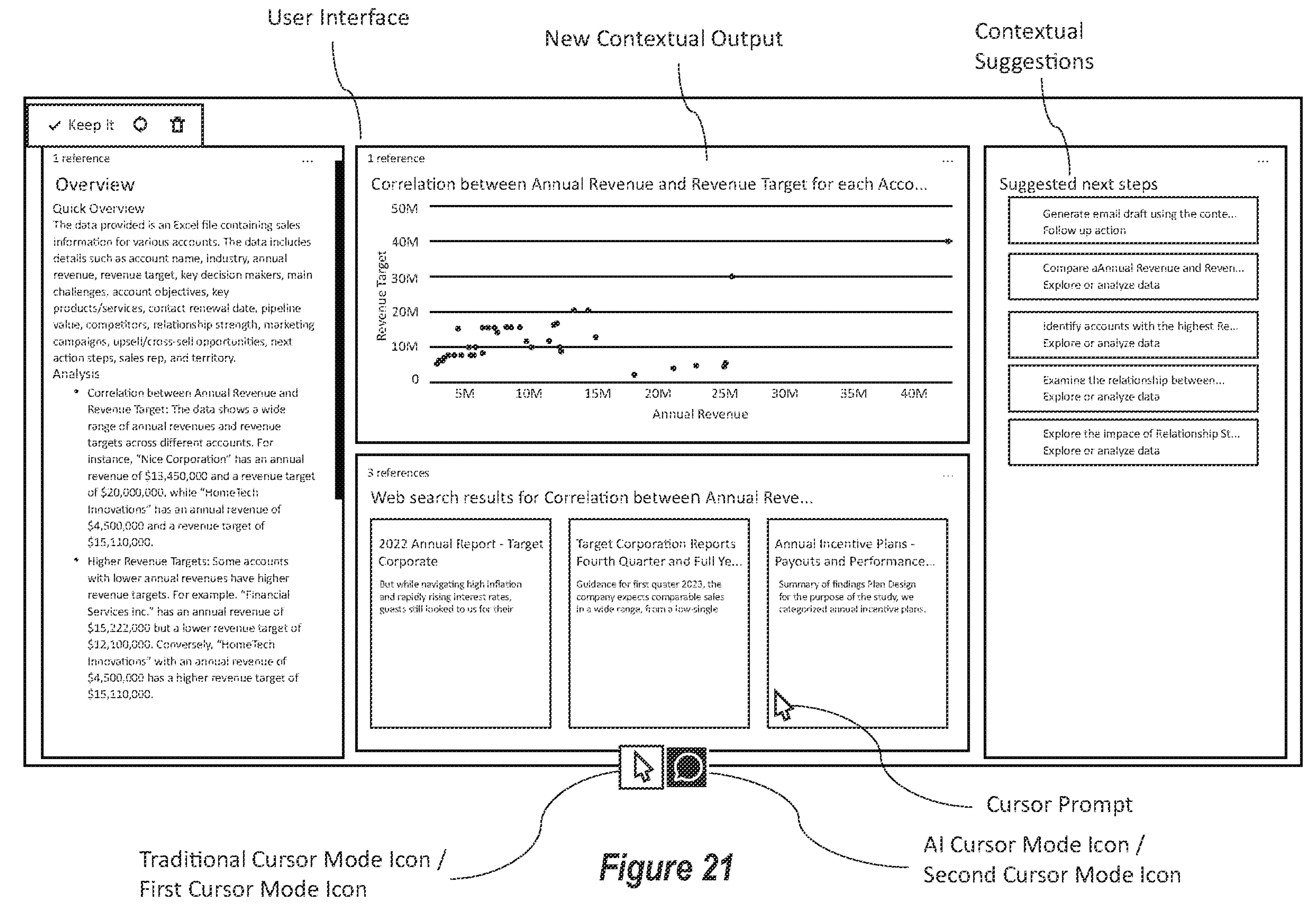

FIGS. 20 and 21 illustrate how the system, after generating the correlation output, may generate it as a new chart, comprising new contextual output, relative to what was shown in FIG. 19. The interface may also, responsively, present additional functions or suggestions that can be applied to the same data or other data corresponding to detected contexts. This set of contextual suggestions may be dynamically updated periodically and/or in response to detected actions by the user and/or in response to new detected contexts.

In FIGS. 20 and 21, the user has subsequently provided new input for selecting the traditional cursor mode icon. This causes the system to activate the first cursor mode and deactivate the second cursor mode. In FIG. 21, this causes the cursor prompt to change into a matching arrow symbol. In FIG. 20, the cursor prompt is changed to a hand. The shape/symbol used for the cursor prompt for each of the first and second cursor modes may be based on preference settings or parameters set by the user through an interface menu (not shown).

The state of the cursor/cursor mode and preferences for the cursor mode prompts may be stored in storage of the system and referenced when user input is received at the interface to ensure the proper cursor mode functionality is applied.

Figure 22:
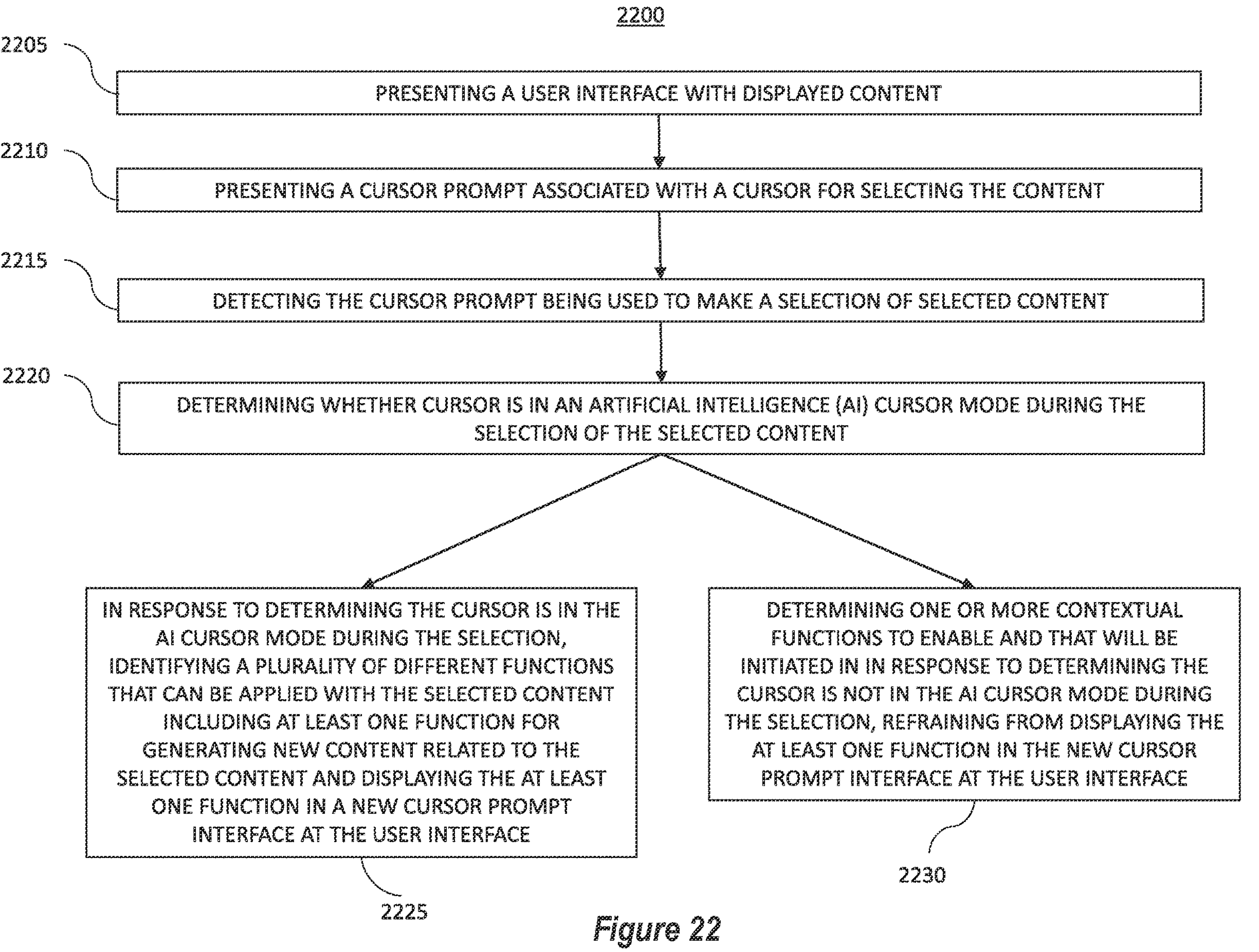
FIG. 22 illustrates an example flow chart of exemplary methods for utilizing cursor prompt interfaces to facilitate multiple functionalities and techniques for interacting with content selected by corresponding cursor prompts.

FIG. 22 illustrates an example flow chart 2200 of acts associated with the disclosed methods for utilizing AI cursor interfaces that display and enable the use of functions that are not typical cursor prompt functions. Depending on which mode the cursor is in when the user selects content, the system will instantiate and display a traditional cursor prompt menu, when the selecting cursor prompt is in the traditional cursor mode (not shown) or, alternatively, instantiate and display the disclosed AI cursor prompt interface/menu, when the selecting cursor prompt is in the referenced AI cursor mode.

As shown, the disclosed methods include an act of presenting a user interface with displayed content (act 2205), presenting a cursor prompt associated with a cursor for selecting the content (act 2210), detecting the cursor prompt being used to make a selection of selected content (act 2215), and determining whether cursor is in an artificial intelligence (AI) cursor mode during the selection of the selected content (act 220) and responsively either: (i) in response to determining the cursor is in the AI cursor mode during the selection, identifying a plurality of different functions that can be applied with the selected content including at least one function for generating new content related to the selected content and displaying the at least one function in a new cursor prompt interface at the user interface (act 2225), or alternatively, (ii) in response to determining the cursor is not in the AI cursor mode during the selection, refraining from displaying the at least one function in the new cursor prompt interface at the user interface (act 2230).

In these embodiments, the identifying the plurality of different functions that can be applied with the selected content includes identifying a context of a user and identifying the plurality of different functions that are contextually relevant to the context of the user.

In some aspects, the referenced at least one function for generating new content comprises a function for generating new content based on a transformation of the selected content, or a function for obtaining and displaying the new content, the new content being accessed from a remote source in response to a request that is based on the selected content.

The function can also include obtaining and displaying the new content, the new content being a translation of the selected content.

The function can also include generating a new chart or graph based on data obtained from the selected content.

In some aspects, the method further comprises performing the at least one function in response to a user selecting the at least one function from the new cursor prompt interface that is generated automatically in response to a user selecting content from the user interface.

In some aspects, the cursor prompt is a multi-modal cursor comprising both (i) a first cursor mode comprising a non-contextual functionality mode and (ii) a second cursor mode comprising a contextual functionality-enabling mode and the methods further include presenting both a traditional cursor mode icon and an artificial intelligence (AI) cursor mode icon within the user interface.

As described earlier, the new content generated with the cursor prompt interface can be displayed with and/or replace the previously selected content that caused the generation of the cursor prompt interface. The selected content can be text, images, charts, graphs or any other data that is displayable within the user interface.

As also described, the methods of the invention also include presenting a user interface with one or more display blocks, each of the one or more display blocks including selectable content, as well as presenting a cursor prompt for a multi-modal cursor within the user interface, the multi-modal cursor being associated with (i) a first cursor mode comprising a non-contextual functionality mode and (ii) a second cursor mode comprising a contextual functionality-enabling mode.

The methods also include presenting both a traditional cursor mode icon and an artificial intelligence (AI) cursor mode icon within the user interface and determining which mode of the multi-modal cursor to activate and utilize in response to user input selecting either the traditional cursor mode icon or, alternatively, the AI cursor mode icon, wherein user selection of the traditional cursor mode icon causes an activation of the first cursor mode and user selection of the AI cursor mode icon causes activation of the second cursor mode.

In some instances, the traditional cursor mode icon and the artificial intelligence (AI) cursor mode icon are presented simultaneously within the user interface.

The format of the cursor prompt associated with the first and second cursor modes may the same or different shapes and colors.

In some instances, the methods further include detecting a user selection of the traditional cursor mode icon and determining to continue presenting the cursor prompt in a first format associated with the first cursor mode without changing a presentation of the cursor prompt from the first format to a second format associated with the second cursor mode.

The methods may also include detecting a user selection of the AI cursor mode icon and determining to change a presentation of the cursor prompt from a first format associated with the first cursor mode to a presentation of the cursor prompt in a second format associated with the second cursor mode.

In some instances, the methods further include determining a context associated with an instance of the user interface and a context of the user and determining one or more contextual functions to enable and that will be initiated in response to a subsequent user input selection made of the selectable text with the cursor prompt when the cursor prompt is in the second cursor mode, the determination of the one or more contextual functions to enable being based a determined context associated with the instance of the user interface and/or the context of the user.

Notably, the subsequent user input selection may cause different actions to be triggered depending on whether the cursor prompt is in the first cursor mode or the second cursor mode. Accordingly, the method may further include: (i) in response to detecting the subsequent user input selection with the cursor prompt while the cursor prompt is in the first cursor mode, causing the subsequent user input to select and highlight the selectable content for a subsequent copy function or to trigger a display of a menu associated with functions that can be performed by an application associated with the user interface with the selectable content that is selected; or alternatively, (i) in response to detecting the subsequent user input selection with the cursor prompt while the cursor prompt is in the second cursor mode, causing the subsequent user input to trigger an interaction with a machine learning model to perform a function associated with the selectable content wherein a selection of the function from a set of different functions is based at least in part on the determined context associated with the instance of the user interface and/or the context of the user.

The content that is selected by the cursor prompt can be any selectable content, such as selectable text content, selectable images, or image content and/or selectable charts, graphs, tables, or other types of such content.

The system may determine the context associated with the instance of the user interface by determining a content type of the selectable content presented within the one or more display blocks and/or by determining a location of the multi-modal cursor within the user interface.

The context can also be a user context determined by the system analyzing user profile, preference, and historical use data. This may also include determining one or more applications that are accessible to the user (including determining application authorizations associated with the user) through the interface and one or more functions that can be applied from the one or more applications to the selectable content.

Disclosed methods may also include displaying a machine-learning model prompt field configured to receive a prompt that the machine-learning model is applied to in response to the prompt being entered into the machine-learning model prompt.

The system is configured to cause the machine-learning model to be applied to both the prompt and the selectable content to generate a response based on the prompt and the selectable content, as well as to cause the response to be displayed in the user interface.

The processed content or the response to the processed content may be displayed in replacement of the selected prompt and/or in a different location on the interface than the selected content and/or simultaneously with the selected content.

After the cursor prompt is in a particular selected cursor state, the system is configured to (i) detect new input selecting the traditional cursor mode icon after the second cursor mode was activated and, responsively, deactivating the second cursor mode and activating the first cursor mode for the cursor prompt, as well as to (ii) detect new user input selecting the AI cursor mode icon after the first cursor mode was activated and, responsively, deactivating the first cursor mode and activating the second cursor mode for the cursor prompt.

Figure 23:
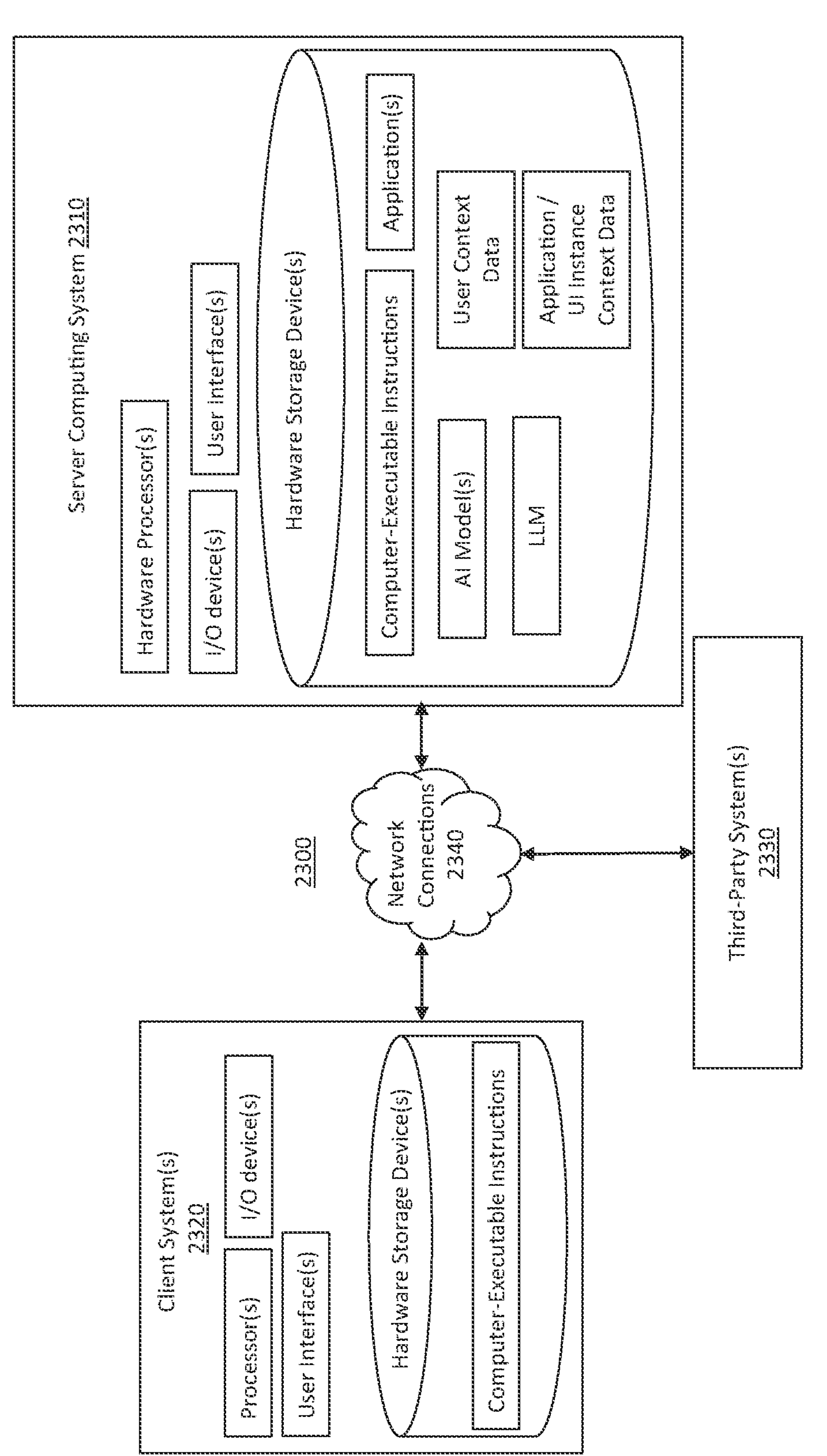
FIG. 23 illustrates an example of a computer system that may be used or incorporated into the disclosed and claimed embodiments.

FIG. 23 illustrates elements of a computer environment 2300 that may be used or incorporated into the disclosed embodiments. This system is an example of two specific-purpose computer systems (e.g., a server computing system 2310 and a client system 2320) in communication with a remote third-party system 2230. Each of these systems may be used to implement the functionality described herein. The client system and third-party system(s) may also include all of the components shown in the server computing system. But they are not duplicated for simplicity and to also show that they may be utilized together as a distributed system.

Embodiments of the disclosure comprise or utilize a general-purpose computer system or a special-purpose computer system (e.g., computer system 2310) that includes computer hardware, such as for example, a processor system (e.g., hardware processor(s)) and system memory, as discussed in greater detail below. Embodiments within the scope of the present disclosure also include physical and other computer-readable media for carrying or storing computer-executable instructions and/or data structures. Such computer-readable media can be any available media accessible by a general-purpose or special-purpose computer system. Computer-readable media that store computer-executable instructions and/or data structures are computer storage media. Computer-readable media that carry computer-executable instructions and/or data structures are transmission media. Thus, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as random access memory (RAM), read-only memory (ROM), electrically erasable programmable ROM (EEPROM), solid state drives (SSDs), flash memory, phase-change memory (PCM), optical disk storage, magnetic disk storage or other magnetic storage devices, or any other hardware storage device(s) which store program code in the form of computer-executable instructions or data structures, which can be accessed and executed by a general-purpose or special-purpose computer system to implement the disclosed functionality.

Transmission media include a network and/or data links that carry program code in the form of computer-executable instructions or data structures that are accessible by a general-purpose or special-purpose computer system. A "network" is defined as a data link that enables the transport of electronic data between computer systems and other electronic devices. When information is transferred or provided over a network or another communications connection (either hardwired, wireless, or a combination thereof) to a computer system, the computer system may view the connection as transmission media. The scope of computer-readable media includes combinations thereof.

Upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network connections 2340) and eventually transferred to computer system RAM and/or less volatile computer storage media at a computer system. Thus, computer storage media can be included in computer system components that also utilize transmission media.

Computer-executable instructions comprise, for example, instructions and data which when executed at a processor system, cause a general-purpose computer system, a special-purpose computer system, or a special-purpose processing device to perform a function or group of functions. In some embodiments, computer-executable instructions comprise binaries, intermediate format instructions (e.g., assembly language), or source code. In some embodiments, a processor system comprises one or more central processing units (CPUs), one or more graphics processing units (GPUs), one or more neural processing units (NPUs), and the like.

In some embodiments, the disclosed systems and methods are practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. In some embodiments, the disclosed systems and methods are practiced in distributed system environments where different computer systems, which are linked through a network (e.g., by hardwired data links, wireless data links, or by a combination of hardwired and wireless data links), both perform tasks. As such, in a distributed system environment, a computer system may include a plurality of constituent computer systems. Program modules may be located in local and remote memory storage devices in a distributed system environment.

In some embodiments, the disclosed systems and methods are practiced in a cloud computing environment. In some embodiments, cloud computing environments are distributed, although this is not required. When distributed, cloud computing environments may be distributed internally within an organization and/or have components possessed across multiple organizations. In this description and the following claims, "cloud computing" is a model for enabling on-demand network access to a shared pool of configurable computing resources (e.g., networks, servers, storage, applications, and services). A cloud computing model can be composed of various characteristics, such as on-demand self-service, broad network access, resource pooling, rapid elasticity, measured service, and so forth. A cloud computing model may also come in the form of various service models such as Software as a Service (Saas), Platform as a Service (PaaS), Infrastructure as a Service (IaaS), etc. The cloud computing model may also be deployed using different deployment models such as private cloud, community cloud, public cloud, hybrid cloud, etc.

Although the subject matter has been described in language specific to structural features and/or methodological acts, it is to be understood that the subject matter defined in the appended claims is not necessarily limited to the described features or acts described supra or the order of the acts described supra. Rather, the described features and acts are disclosed as example forms of implementing the claims.

The present disclosure may be embodied in other specific forms without departing from its essential characteristics. The described embodiments are only illustrative and not restrictive. All changes which come within the meaning and range of equivalency of the claims are to be embraced within their scope.

NUMBERED CLAUSES

The present invention can also be described in accordance with the following numbered clauses.

Clause 1. A computer-implemented method for utilizing cursor prompt interfaces to facilitate multiple functionalities and techniques for interacting with content selected by corresponding cursor prompts, the method comprising: presenting a user interface with displayed content; presenting a cursor prompt associated with a cursor for selecting the content; detecting the cursor prompt being used to make a selection of selected content; and determining whether cursor is in an artificial intelligence (AI) cursor mode during the selection of the selected content and responsively either: (i) in response to determining the cursor is in the AI cursor mode during the selection, identifying a plurality of different functions that can be applied with the selected content including at least one function for generating new content related to the selected content and displaying the at least one function in a new cursor prompt interface at the user interface, or alternatively, (ii) in response to determining the cursor is not in the AI cursor mode during the selection, refraining from displaying the at least one function in the new cursor prompt interface at the user interface.

Clause 2. The method of clause 1, wherein identifying the plurality of different functions that can be applied with the selected content includes identifying a context of a user and identifying the plurality of different functions that are contextually relevant to the context of the user.

Clause 3. The method of clause 1, wherein the at least one function for generating new content comprises a function for generating new content based on a transformation of the selected content.

Clause 4. The method of clause 1, wherein the at least one function for generating new content comprises a function for obtaining and displaying the new content, the new content being accessed from a remote source in response to a request that is based on the selected content.

Clause 5. The method of clause 1, wherein the at least one function for generating new content comprises a function for obtaining and displaying the new content, the new content being a translation of the selected content.

Clause 6. The method of clause 1, wherein the at least one function for generating new content comprises a function for generating a new chart or graph based on data obtained from the selected content.

Clause 7. The method of clause 1, wherein the method further comprises performing the at least one function in response to a user selecting the at least one function from the new cursor prompt interface.

Clause 8. The method of clause 7, wherein the method further includes receiving user input at the new cursor prompt interface for replacing the selected content and wherein generating and displaying the new content after performing the at least one function includes replacing the selected content with the new content.

Clause 9. The method of clause 7, wherein the method further includes generating and displaying the new content concurrently with the selected content in the user interface after performing the at least one function.

Clause 10. The method of clause 1, wherein the cursor prompt is a multi-modal cursor comprising both (i) a first cursor mode comprising a non-contextual functionality mode and (ii) a second cursor mode comprising a contextual functionality-enabling mode and wherein the method further comprises: presenting both a traditional cursor mode icon and an artificial intelligence (AI) cursor mode icon within the user interface.

Clause 11. The method of clause 10, wherein the method further includes detecting a user selection of the AI cursor mode icon and determining to change a presentation of the cursor prompt from a first format associated with the first cursor mode to a presentation of the cursor prompt in a second format associated with the second cursor mode.

Clause 12. The method of clause 1 further comprising: determining a context associated with an instance of the user interface and a context of the user; and the plurality of different functions being identified at least partially based on the context of the user interface and the context of the user.

Clause 13. The method of clause 12, wherein determining the context associated with the instance of the user interface comprises determining a content type of the selected content presented within the one or more display blocks and a location of the cursor prompt within the user interface.

Clause 14. The method of clause 12, wherein determining the context associated with the instance of the user interface comprises determining one or more applications that are accessible to the user through the interface and one or more functions that can be applied from the one or more applications to the selectable content.

Clause 15. The method of clause 1, wherein the method further comprises displaying a machine-learning model prompt field configured to receive a prompt that the machine-learning model is applied to in response to the prompt being entered into the machine-learning model prompt, the machine-learning model prompt field being displayed within the new cursor prompt interface.

Clause 16. The method of clause 15, the method further comprises causing the machine-learning model to be applied to both the prompt and the selected content to generate a response based on the prompt and the selected content.

Clause 17. The method of clause 16, the method further comprising causing the response to be displayed at the user interface.

Clause 18. The method of clause 17, wherein the response is displayed with the selected content.

Clause 19. The method of clause 17, wherein the response replaces the selected content within the user interface.

Clause 20. The method of clause 1, wherein the selected content comprises text.

Clause 21. The method of clause 1, wherein the selected content comprises an image.

Clause 22. The method of clause 1, wherein the selectable content comprises a chart or graph.

Clause 23. A system, comprising: a processor system; and a computer storage medium that stores computer-executable instructions that are executable by the processor system to implement a method for utilizing cursor prompt interfaces and by at least causing the system to: present a user interface with displayed content; present a cursor prompt associated with a cursor for selecting the content; detect the cursor prompt being used to make a selection of selected content; and determine whether cursor is in an artificial intelligence (AI) cursor mode during the selection of the selected content and responsively either: (i) in response to determining the cursor is in the AI cursor mode during the selection, identify a plurality of different functions that can be applied with the selected content including at least one function for generating new content related to the selected content and displaying the at least one function in a new cursor prompt interface at the user interface, or alternatively, (ii) in response to determining the cursor is not in the AI cursor mode during the selection, refrain from displaying the at least one function in the new cursor prompt interface at the user interface.

Clause 24. The system of clause 23, wherein identifying the plurality of different functions that can be applied with the selected content includes identifying a context of a user and identifying the plurality of different functions that are contextually relevant to the context of the user.

Clause 25. The system of clause 23, wherein the at least one function for generating new content comprises a function for generating new content based on a transformation of the selected content.

Clause 26. The system of clause 23, wherein the at least one function for generating new content comprises a function for obtaining and displaying the new content, the new content being accessed from a remote source in response to a request that is based on the selected content.

Clause 27. The system of clause 23, wherein the at least one function for generating new content comprises a function for obtaining and displaying the new content, the new content being a translation of the selected content.

Clause 28. The system of clause 23, wherein the at least one function for generating new content comprises a function for generating a new chart or graph based on data obtained from the selected content.

Clause 29. The system of clause 23, wherein the method further comprises performing the at least one function in response to a user selecting the at least one function from the new cursor prompt interface.

Clause 30. The system of clause 29, wherein the method further includes receiving user input at the new cursor prompt interface for replacing the selected content and wherein generating and displaying the new content after performing the at least one function includes replacing the selected content with the new content.

Clause 31. The system of clause 29, wherein the method further includes generating and displaying the new content concurrently with the selected content in the user interface after performing the at least one function.

Clause 32. The system of clause 23, wherein the cursor prompt is a multi-modal cursor comprising both (i) a first cursor mode comprising a non-contextual functionality mode and (ii) a second cursor mode comprising a contextual functionality-enabling mode and wherein the method further comprises: presenting both a traditional cursor mode icon and an artificial intelligence (AI) cursor mode icon within the user interface.

Clause 33. The system of clause 32, wherein the method further includes detecting a user selection of the AI cursor mode icon and determining to change a presentation of the cursor prompt from a first format associated with the first cursor mode to a presentation of the cursor prompt in a second format associated with the second cursor mode.

Clause 34. The system of clause 23, wherein the method further comprises: determining a context associated with an instance of the user interface and a context of the user; and the plurality of different functions being identified at least partially based on the context of the user interface and the context of the user.

Clause 35. The system of clause 34, wherein determining the context associated with the instance of the user interface comprises determining a content type of the selected content presented within the one or more display blocks.

Clause 36. The system of clause 34, wherein determining the context associated with the instance of the user interface further comprises determining a location of the cursor prompt within the user interface.

Clause 37. The system of clause 34, wherein determining the context associated with the instance of the user interface comprises determining one or more applications that are accessible to the user through the interface and one or more functions that can be applied from the one or more applications to the selectable content.

Clause 38. The system of clause 23, wherein the method further comprises displaying a machine-learning model prompt field configured to receive a prompt that the machine-learning model is applied to in response to the prompt being entered into the machine-learning model prompt, the machine-learning model prompt field being displayed within the new cursor prompt interface.

Clause 39. The system of clause 38, the method further comprises causing the machine-learning model to be applied to both the prompt and the selected content to generate a response based on the prompt and the selected content.

Clause 40. The system of clause 39, the method further comprising causing the response to be displayed at the user interface.

Clause 41. The system of clause 40, wherein the response is displayed with the selected content.

Clause 42. The system of clause 17, wherein the response replaces the selected content within the user interface.

Clause 43. The system of clause 23, wherein the selected content comprises text.

Clause 44. The system of clause 23, wherein the selected content comprises an image.

Clause 45. The system of clause 1, wherein the selectable content comprises a chart or graph.

When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A computer-implemented method for utilizing cursor prompt interfaces to facilitate multiple functionalities and techniques for interacting with content selected by corresponding cursor prompts, the method comprising:

presenting a user interface with displayed content;

presenting a cursor prompt associated with a cursor for selecting the content;

detecting the cursor prompt being used to make a selection of selected content; and determining whether cursor is in an artificial intelligence (AI) cursor mode during the selection of the selected content and responsively:

(i) in response to determining the cursor is in the AI cursor mode during the selection, displaying a machine-learning model prompt field configured to receive a prompt that the machine-learning model is applied to in response to the prompt being entered into the machine-learning model prompt field, and identifying a plurality of different functions that can be applied with the selected content including at least one function for generating new content related to the selected content and displaying the at least one function in a new cursor prompt interface at the user interface, or alternatively, (ii) in response to determining the cursor is not in the AI cursor mode during the selection, refraining from displaying the at least one function in the new cursor prompt interface at the user interface.

2. The method of claim 1, wherein identifying the plurality of different functions that can be applied with the selected content includes identifying a context of a user and identifying the plurality of different functions that are contextually relevant to the context of the user.

3. The method of claim 1, wherein the at least one function for generating new content comprises a function for generating new content based on a transformation of the selected content.

4. The method of claim 1, wherein the at least one function for generating new content comprises a function for obtaining and displaying the new content, the new content being accessed from a remote source in response to a request that is based on the selected content.

5. The method of claim 1, wherein the at least one function for generating new content comprises a function for obtaining and displaying the new content, the new content being a translation of the selected content.

6. The method of claim 1, wherein the at least one function for generating new content comprises a function for generating a new chart or graph based on data obtained from the selected content.

7. The method of claim 1, wherein the method further comprises performing the at least one function in response to a user selecting the at least one function from the new cursor prompt interface.

8. The method of claim 7, wherein the method further includes receiving user input at the new cursor prompt interface for replacing the selected content and wherein generating and displaying the new content after performing the at least one function includes replacing the selected content with the new content.

9. The method of claim 7, wherein the method further includes generating and displaying the new content concurrently with the selected content in the user interface after performing the at least one function.

10. The method of claim 1, wherein the cursor prompt is a multi-modal cursor comprising both (i) a first cursor mode comprising a non-contextual functionality mode and (ii) a second cursor mode comprising a contextual functionality-enabling mode and wherein the method further comprises:

presenting both a traditional cursor mode icon and an artificial intelligence (AI) cursor mode icon within the user interface.

11. The method of claim 10, wherein the method further includes detecting a user selection of the AI cursor mode icon and determining to change a presentation of the cursor prompt from a first format associated with the first cursor mode to a presentation of the cursor prompt in a second format associated with the second cursor mode.

12. The method of claim 1 further comprising:

determining a context associated with an instance of the user interface and a context of the user; and the plurality of different functions being identified at least partially based on the context of the user interface and the context of the user.

13. The method of claim 12, wherein determining the context associated with the instance of the user interface comprises determining a content type of the selected content presented within the one or more display blocks and a location of the cursor prompt within the user interface.

14. The method of claim 12, wherein determining the context associated with the instance of the user interface comprises determining one or more applications that are accessible to the user through the interface and one or more functions that can be applied from the one or more applications to the selectable content.

15. The method of claim 1, the method further comprises causing the machine-learning model to be applied to both the prompt and the selected content to generate a response based on the prompt and the selected content.

16. The method of claim 15, the method further comprising causing the response to be displayed at the user interface.

17. The method of claim 16, wherein the response is displayed with the selected content.

18. The method of claim 16, wherein the response replaces the selected content within the user interface.

19. The method of claim 1, wherein the selected content comprises text.

20. The method of claim 1, wherein the selected content comprises an image.

21. The method of claim 1, wherein the selectable content comprises a chart or graph.

22. A computer-implemented method for utilizing cursor prompt interfaces to facilitate multiple functionalities and techniques for interacting with content selected by corresponding cursor prompts, the method comprising:

presenting a user interface with displayed content;

presenting a cursor prompt associated with a cursor for selecting the content;

detecting the cursor prompt being used to make a selection of selected content;

determining whether cursor is in an artificial intelligence (AI) cursor mode during the selection of the selected content and responsively either:

(i) in response to determining the cursor is in the AI cursor mode during the selection, identifying a plurality of different functions that can be applied with the selected content including at least one function for generating new content related to the selected content and displaying the at least one function in a new cursor prompt interface at the user interface, or alternatively, (ii) in response to determining the cursor is not in the AI cursor mode during the selection, refraining from displaying the at least one function in the new cursor prompt interface at the user interface; and switching a visual display of the cursor between a first format and a second format in response to detecting that the cursor is switched between a first mode comprising the AI cursor mode and a second mode that is not the AI cursor mode and by displaying the cursor in the first format associated with the AI cursor mode when it is determined the cursor is in the AI cursor mode and displaying the cursor in the second format that is visibly distinguished from the first format mode when it is determined that the cursor is not in the AI cursor mode.

* * * * *